(12) United States Patent
    Nakamoto

(10) Patent No.: US 8,989,600 B2
(45) Date of Patent: Mar. 24, 2015

(54) MODULATING APPARATUS

(71) Applicant: Fujitsu Optical Components Limited, Kawasaki-shi, Kanagawa (JP)

(72) Inventor: Kenichi Nakamoto, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 0 days.

(21) Appl. No.: 14/040,140

(22) Filed: Sep. 27, 2013

(65) Prior Publication Data
    US 2014/0126913 A1    May 8, 2014

(30) Foreign Application Priority Data

Nov. 2, 2012 (JP) ................................. 2012-243160

(51) Int. Cl.
    *H04B 10/04* (2006.01)
    *H04B 10/50* (2013.01)
    *H04B 10/54* (2013.01)

(52) U.S. Cl.
    CPC ........ *H04B 10/5051* (2013.01); *H04B 10/5053* (2013.01); *H04B 10/50572* (2013.01); *H04B 10/541* (2013.01)
    USPC ........... 398/188; 398/183; 398/198; 398/184; 398/185; 398/201; 359/238; 359/279; 359/245; 359/248; 385/2; 385/3; 385/14

(58) Field of Classification Search
    USPC ......... 398/183, 184, 185, 186, 187, 188, 192, 398/195, 196, 197, 198, 200, 201, 158, 159, 398/160, 135, 136; 359/237, 238, 239, 245, 359/247, 248, 276, 279; 385/1, 2, 3, 14, 15, 385/129, 130
    See application file for complete search history.

(56) References Cited

U.S. PATENT DOCUMENTS

| 7,751,724 B2* | 7/2010 | Hashimoto et al. ........... 398/183 |
| 8,391,724 B2* | 3/2013 | Aruga et al. .................. 398/198 |
| 2009/0244685 A1 | 10/2009 | Hoshida et al. |

FOREIGN PATENT DOCUMENTS

| JP | 2009-244682 | 10/2009 |
| JP | 2011-43575 | 3/2011 |

* cited by examiner

*Primary Examiner* — Hanh Phan
(74) *Attorney, Agent, or Firm* — Staas & Halsey LLP

(57) ABSTRACT

A modulating apparatus includes a branch that branches input light; a first modulating unit that modulates the phase of a first branch obtained by the branch; a second modulating unit that modulates a second branch obtained by the branch; a third modulating unit that is connected in series to the first modulating unit, transmits the first branch without branching the first branch, modulates the phase of light transmitted by controlling a refractive index of the light transmitted; a fourth modulating unit that is connected in series to the second modulating unit, transmits the second branch without branching the second branch, and modulates the phase of a light transmitted by controlling a refractive index of the light transmitted; and a coupler that couples the first branch modulated by the first and the third modulating units and the second branch modulated by the second and the fourth modulating units, at different intensities.

13 Claims, 27 Drawing Sheets

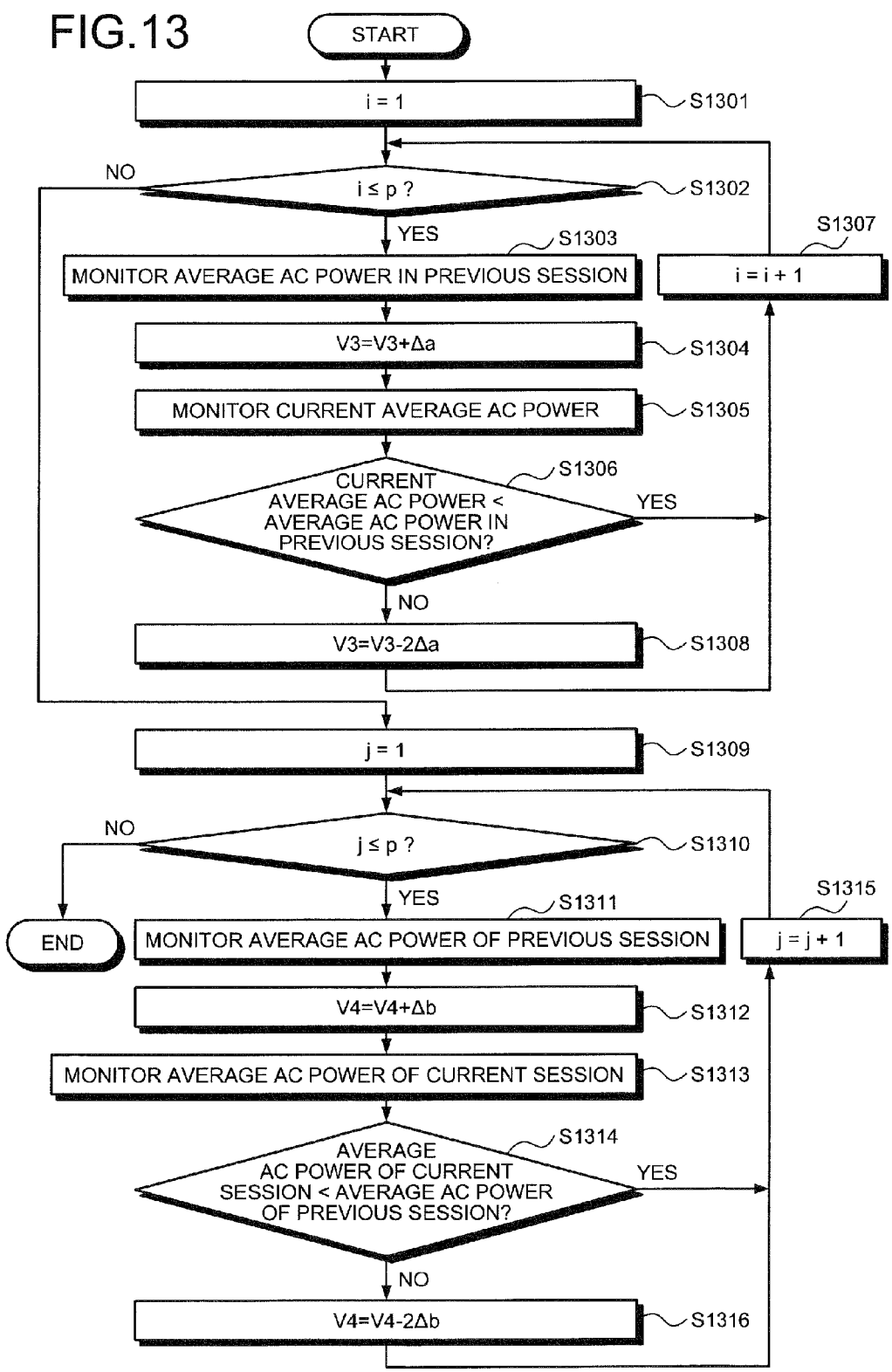

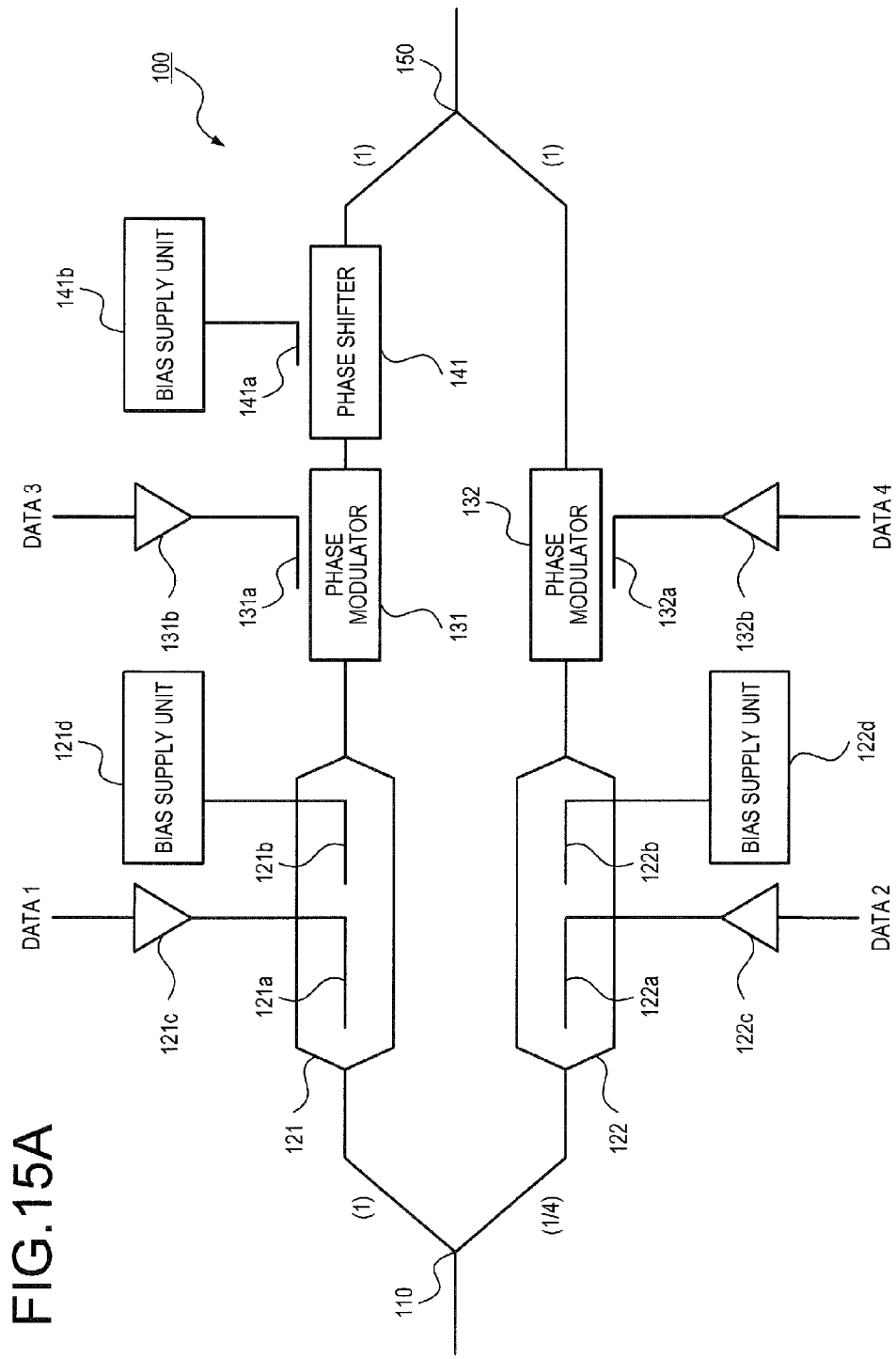

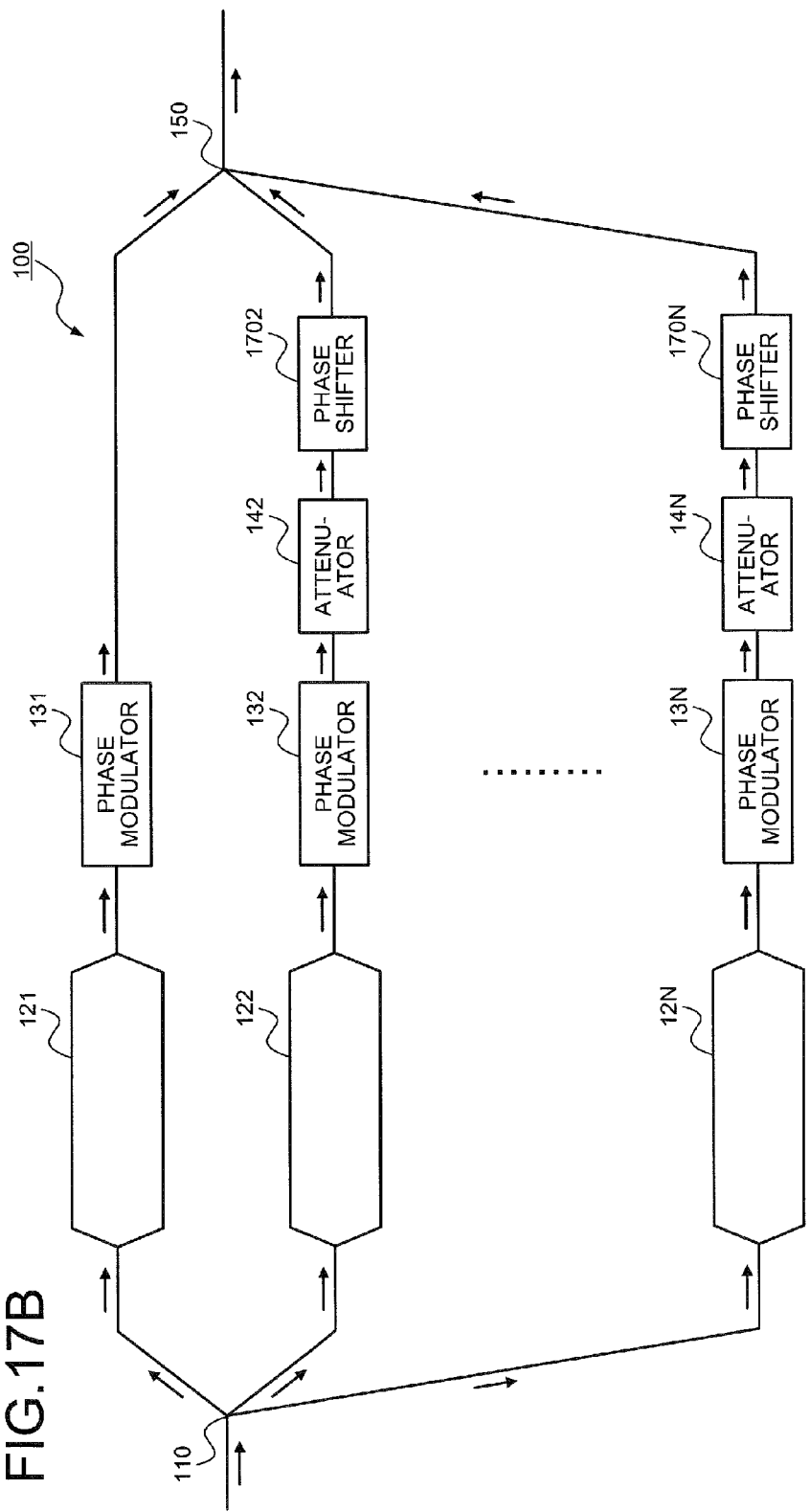

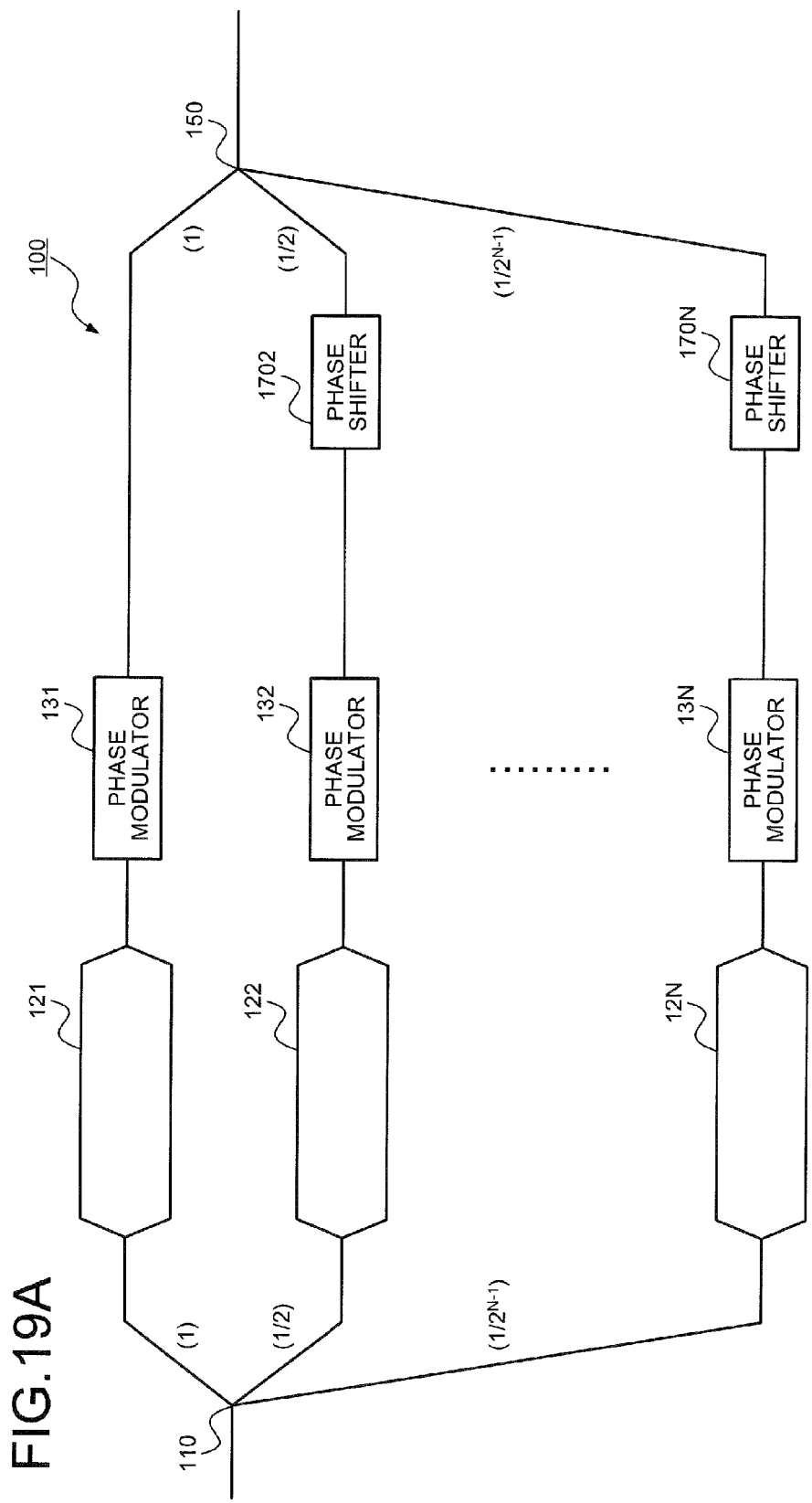

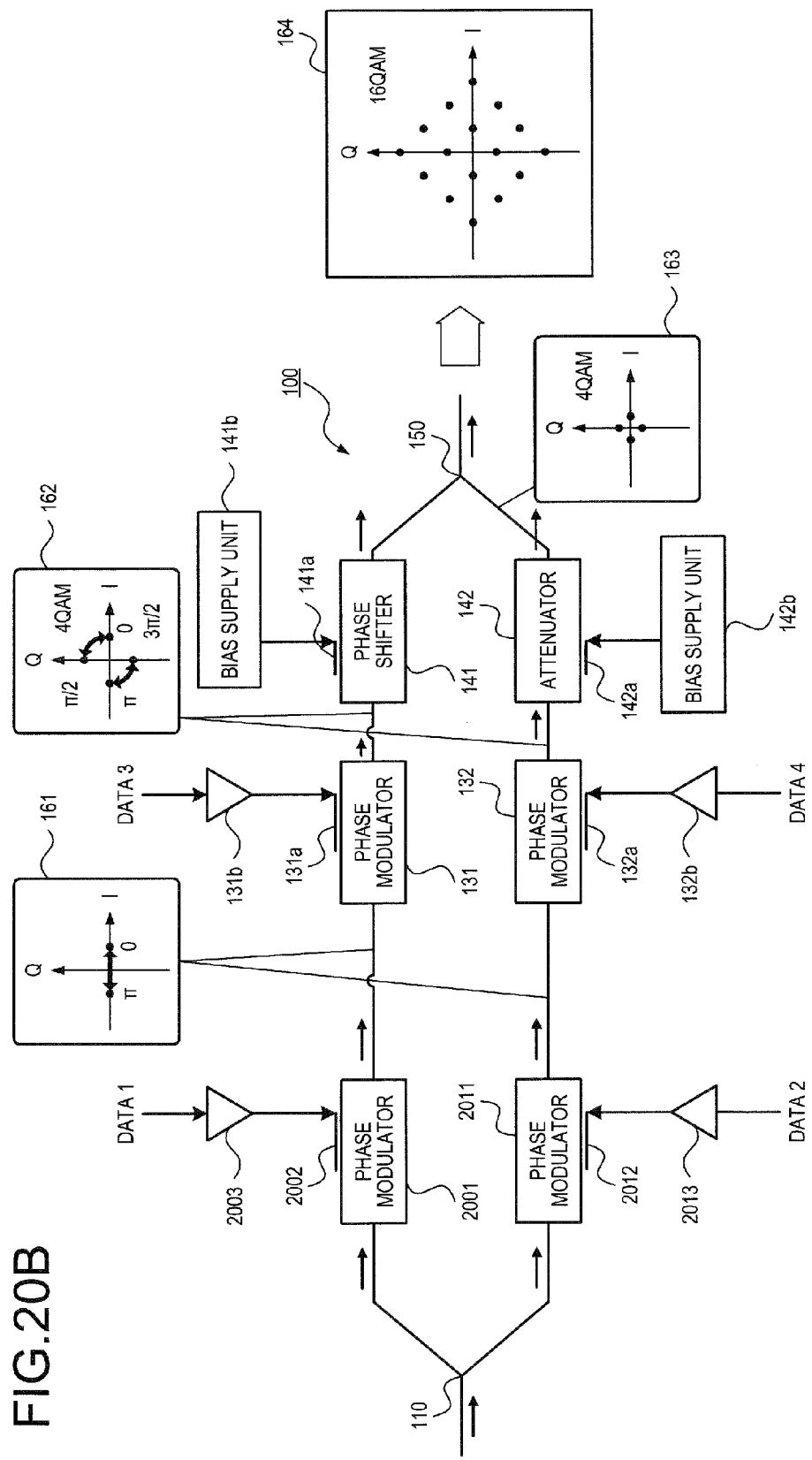

MODULATING APPARATUS

CROSS REFERENCE TO RELATED APPLICATIONS

This application is based upon and claims the benefit of priority of the prior Japanese Patent Application No. 2012-243160, filed on Nov. 2, 2012, the entire contents of which are incorporated herein by reference.

FIELD

The embodiments discussed herein are related to a modulating apparatus.

BACKGROUND

Quadrature amplitude modulation (QAM) has conventionally been known as a modulating scheme to transmit data by adjusting the amplitudes and phases of two carrier waves that are independent from each other. For example, a modulator is known as a QAM modulator, that is configured to: cause plural Mach-Zehnder modulators to execute multi-value (for example, four-value) phase modulation; and couple the acquired optical signals (see, e.g., Japanese Laid-Open Patent Publication No. 2009-244682).

However, according to the conventional technique, the Mach-Zehnder modulator executing the multi-value phase modulation has many components to be controlled such as a π/2 shifter and a bias supply unit. Therefore, a problem arises that the control of the Mach-Zehnder modulator is complicated.

SUMMARY

According to an aspect of an embodiment, a modulating apparatus includes a branch that branches a light beam input thereinto; a first modulating unit that modulates the phase of a first light beam of light beams branched by the branch; a second modulating unit that modulates a second light beam different from the first light beam of the light beams branched by the branch; a third modulating unit that is connected in series to the first modulating unit and transmits the first light beam without branching the first light beam, the third modulating unit modulating the phase of a light beam transmitted thereby by controlling a refractive index of the light beam transmitted thereby; a fourth modulating unit that is connected in series to the second modulating unit and transmits the second light beam without branching the second light beam, the fourth modulating unit modulating the phase of a light beam transmitted thereby by controlling a refractive index of the light beam transmitted thereby; and a coupler that couples the first light beam of which phase is modulated by the first and the third modulating units and the second light beam of which phase is modulated by the second and the fourth modulating units, at different intensities.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a flowchart of a control process for the driving unit of the phase modulator executed by the control unit;

FIG. 15A is a diagram of an example of a specific configuration of a modulating apparatus according to a second embodiment;

FIG. 17B is a diagram of an example of flows of light beams and electric signals in the modulating apparatus depicted in FIG. 17A;

FIG. 19A is a diagram of a configuration of the variation 2 of the modulating apparatus according to the third embodiment;

FIG. 20B is a diagram of an example of flows of light beams and electric signals in the modulating apparatus depicted in FIG. 20A.

DESCRIPTION OF EMBODIMENTS

Preferred embodiments will be described in detail with reference to the accompanying drawings.

Figure 1A:
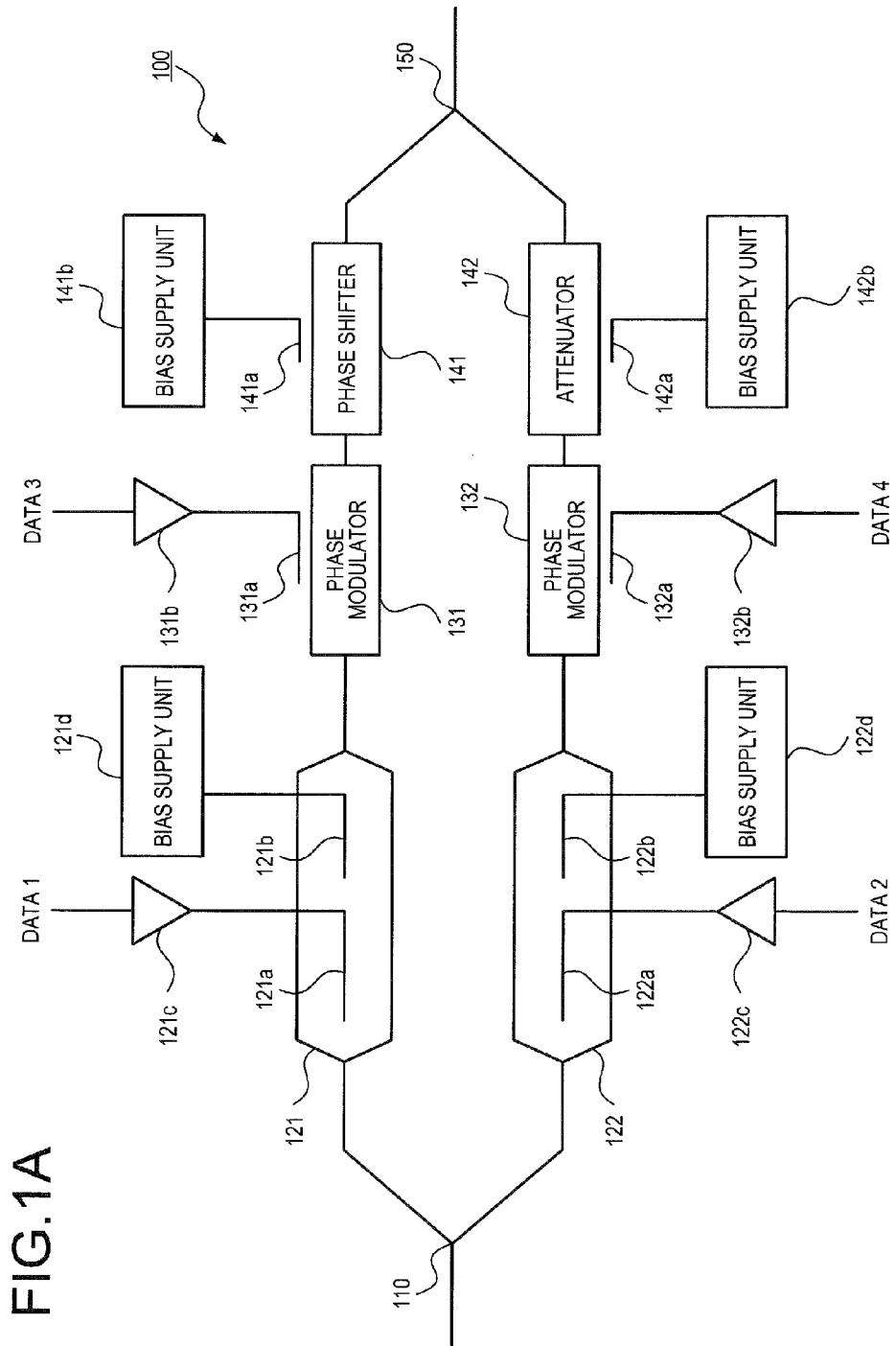
FIG. 1A is a diagram of an example of a modulating apparatus according to a first embodiment.
Figure 1B:
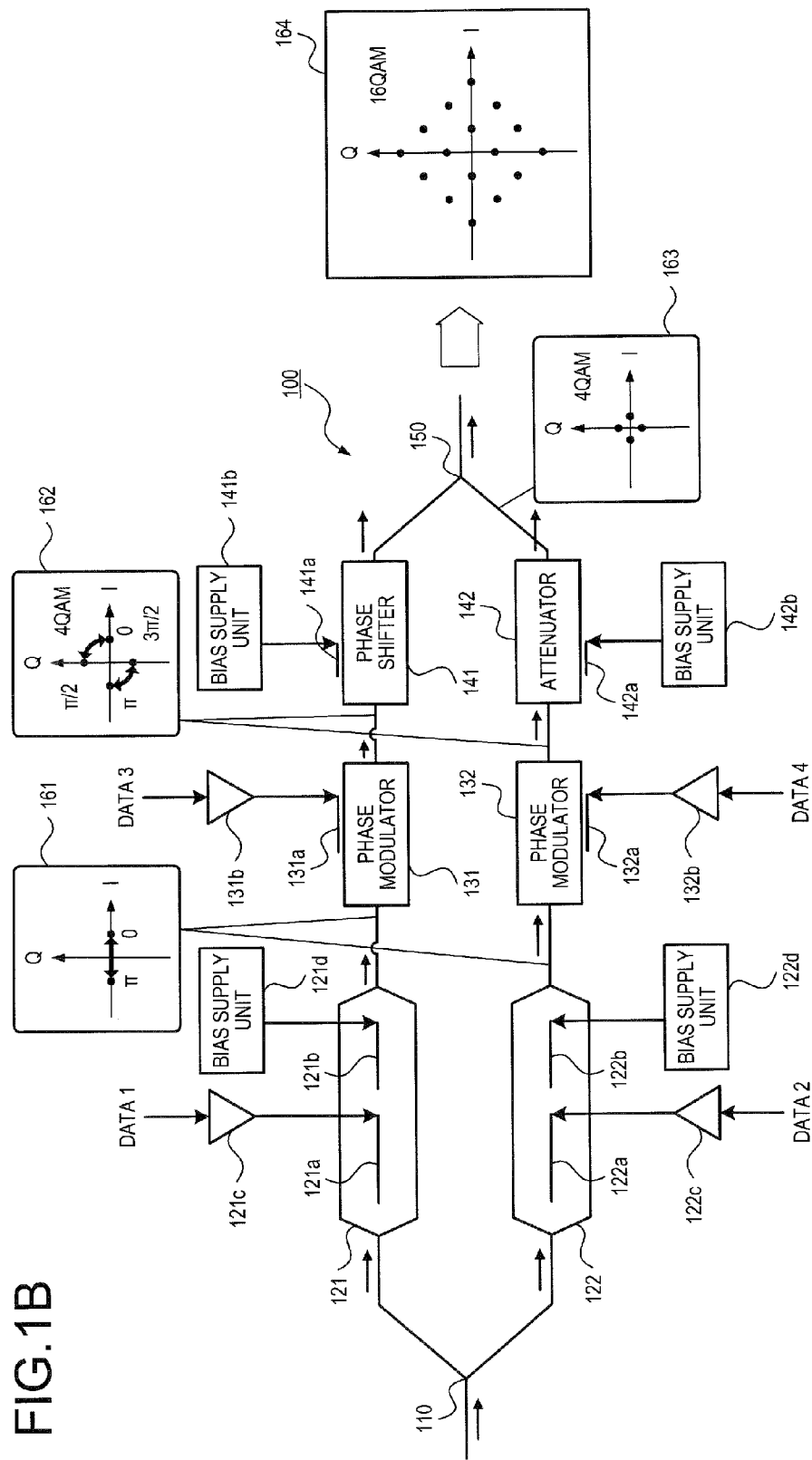
FIG. 1B is a diagram of an example of flows of light beams and electric signals in the modulating apparatus depicted in FIG. 1A.

FIG. 1A is a diagram of an example of a modulating apparatus according to a first embodiment. FIG. 1B is a diagram of an example of flows of light beams and electric signals in the modulating apparatus depicted in FIG. 1A. A modulating apparatus 100 depicted in FIGS. 1A and 1B executes quadrature amplitude modulation (QAM) for a light beam input thereinto. The modulating apparatus 100 is input with, for example, a continuous wave (CW) laser light beam from an external light source.

The modulating apparatus 100 includes a branch 110, Mach-Zehnder modulators (MZMs) 121 and 122, driving units 121c, 122c, 131b, and 132b, bias supply units 121d, 122d, 141b, and 142b, phase modulators (PMs) 131 and 132, a phase shifter 141, an attenuator 142, and a coupler 150.

The branch 110 branches a light beam input into the modulating apparatus 100, and outputs the branched light beams to the Mach-Zehnder modulators 121 and 122.

The Mach-Zehnder modulator 121 includes an RF electrode 121a and a DC electrode 121b. The driving unit 121c generates a driving signal that corresponds to data 1 input thereinto, and applies the driving signal to the RF electrode 121a. The bias supply unit 121d applies a bias voltage to the DC electrode 121b.

The Mach-Zehnder modulator 121 executes two-value (0 and π) phase modulation for the light beam output from the branch 110, corresponding to the driving signal applied to the RF electrode 121a. The transmission property of the light beam in the Mach-Zehnder modulator 121 can be adjusted by controlling the bias voltage applied from the bias supply unit 121d to the DC electrode 121b. The Mach-Zehnder modulator 121 outputs the light beams acquired by the phase modulation to the phase modulator 131.

The Mach-Zehnder modulator 122 includes an RF electrode 122a and a DC electrode 122b. The driving unit 122c generates a driving signal that corresponds to data 2 input thereinto, and applies the driving signal to the RF electrode 122a. The bias supply unit 122d applies a bias voltage to the DC electrode 122b.

The Mach-Zehnder modulator 122 executes two-value (0 and π) phase modulation for the light beam output from the branch 110, corresponding to the driving signal applied to the RF electrode 122a. The transmission property of the light beam in the Mach-Zehnder modulator 122 can be adjusted by controlling the bias voltage applied from the bias supply unit 122d to the DC electrode 122b. The Mach-Zehnder modulator 122 outputs the light beam acquired by the phase modulation to the phase modulator 132.

A constellation 161 depicts the phase and the amplitude of the light beams output from the Mach-Zehnder modulators 121 and 122, with the horizontal axis representing an in-phase component I and the vertical axis representing a quadrature component Q. As depicted in the constellation 161, the phase of the light beams output from the Mach-Zehnder modulators 121 and 122 is zero or π.

The phase modulator 131 includes an RF electrode 131a. The driving unit 131b generates a driving signal that corresponds to data 3 input thereinto and applies the driving signal to the RF electrode 131a. The phase modulator 131 executes phase modulation to vary the phase of the optical signal output from the Mach-Zehnder modulator 121 by zero or π/2, corresponding to the driving signal applied to the RF electrode 131a. Thus, four-value (zero, π/2, π, and 3π/2) phase modulation can be executed. The phase modulator 131 outputs to the phase shifter 141 the light beam acquired by the phase modulation.

The phase modulator 132 includes an RF electrode 132a. The driving unit 132b generates a driving signal that corresponds to data 4 input thereinto and applies the driving signal to the RF electrode 132a. The phase modulator 132 executes phase modulation to vary the phase of the optical signal output from the Mach-Zehnder modulator 122 by zero or π/2, corresponding to the driving signal applied to the RF electrode 132a. Thus, four-value (zero, π/2, π, and 3π/2) phase modulation can be executed. The phase modulator 132 outputs to the attenuator 142 the light beam acquired by the phase modulation.

A constellation 162 depicts the optical signals output from the phase modulators 131 and 132. As depicted in the constellation 162, the phase of the light beams output from the phase modulators 131 and 132 is zero, π/2, π, or 3π/2.

The phase modulators 131 and 132 are provided downstream of the Mach-Zehnder modulators 121 and 122, respectively. However, the arrangement is not limited to this and the phase modulators 131 and 132 may be provided upstream and the Mach-Zehnder modulators 121 and 122 may be provided downstream.

The phase shifter 141 includes a DC electrode 141a. The bias supply unit 141b applies a bias voltage to the DC electrode 141a. The phase shifter 141 corrects the phase of the optical signal output from the phase modulator 131 by controlling the bias voltage applied from the bias supply unit 141b to the DC electrode 141a. Thus, the shift of the phase of each symbol between the optical signal output from the phase shifter 141 to the coupler 150 and the optical signal output from the attenuator 142 to the coupler 150 can be corrected. The phase shifter 141 outputs the optical signal whose phase is corrected, to the coupler 150.

The attenuator 142 attenuates the optical signal output from the phase modulator 132 by a predetermined amount.

For example, the attenuator 142 is a Mach-Zehnder attenuator and includes a DC electrode 142a. The bias supply unit 142b applies a bias voltage to the DC electrode 142a. The attenuator 142 attenuates by, for example, 6 [dB] the intensity of the optical signal output from the phase modulator 132 by controlling the bias voltage applied from the bias supply unit 142b to the DC electrode 142a.

A constellation 163 depicts the optical signal output from the attenuator 142. In the constellation 163, the distance from the origin to each symbol is halved compared to that in the constellation 162. Thus, the optical signal output from the attenuator 142 has the intensity that is ¼ of that of the optical signal output from the phase modulator 132. The attenuator 142 outputs the attenuated optical signal to the coupler 150.

The coupler 150 couples the optical signal output from the phase shifter 141 and that output from the attenuator 142. A constellation 164 depicts the result of addition of the vectors from the origin to the symbols depicted in constellations 162 and 163. For example, the constellation 164 depicts a sum (a coupled vector) of combinations of four vectors from the origin to the symbols depicted in the constellation 162 and those depicted in the constellation 163.

Thus, the optical signal output from the coupler 150 becomes a 16-QAM optical signal having 16 symbols. The distance from the origin to each symbol represents the intensity of the light beam and, therefore, each of the 16 symbols takes any one of three kinds of optical intensities in the constellation 164.

The Mach-Zehnder modulator 121 implements a first modulating unit that modulates the phase of a first light beam of the branched light beams. The Mach-Zehnder modulator 122 implements a second modulating unit that modulates a second light beam of the branched light beams that is different from the first light beam. The phase-modulator 131 implements a third modulating unit that is connected in series to the first modulating unit, that transmits the first light beam without branching the first light beam, and that modulates the phase of the light beam transmitted thereby by controlling the refractive index of the light beam transmitted thereby.

The phase-modulator 132 implements a fourth modulating unit that is connected in series to the second modulating unit, that transmits the second light beam without branching the second light beam, and that modulates the phase of the light beam transmitted thereby by controlling the refractive index of the light beam transmitted thereby. The coupler 150 implements a coupler that couples at different intensities the first light beam of which phase is modulated by the first and the third modulating units and the second light beam of which phase is modulated by the second and the fourth modulating units. The attenuator 142 implements an attenuator that attenuates at least either one of the first and the second light beams such that the intensities of the first and the second light beams to be coupled by the coupler differ from each other.

Figure 2:
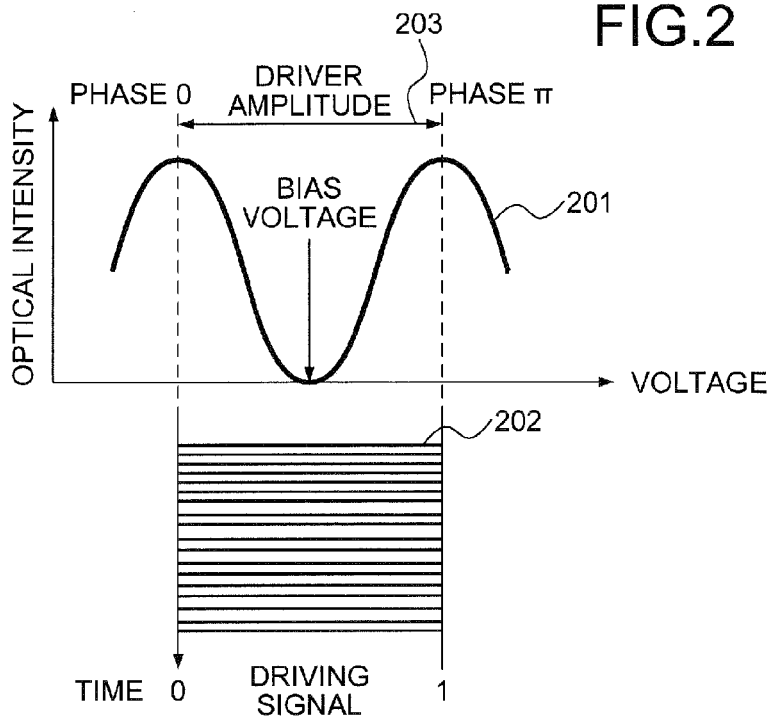
FIG. 2 is a diagram of an example of the relation between the intensity of the optical signal after being transmitted by a Mach-Zehnder modulator and a driving signal.

FIG. 2 is a diagram of an example of the relation between the intensity of the optical signal after being transmitted by the Mach-Zehnder modulator and the driving signal. In FIG. 2, the horizontal axis represents the voltage of the driving signal input into the Mach-Zehnder modulators 121 and 122 and the vertical axis represents the intensity (optical intensity) of the optical signal after being transmitted by each of the Mach-Zehnder modulators 121 and 122. A driving signal 202 represents the driving signal input into the Mach-Zehnder modulators 121 and 122. A driver amplitude 203 represents the amplitude of the driving signal 202.

A transmission property 201 represents the transmission property of the light beam of each of the Mach-Zehnder modulators 121 and 122 to the voltage of the driving signal 202 input into the Mach-Zehnder modulators 121 and 122. The driving signal 202 takes a value of zero or one. As depicted by the transmission property 201, when the driving signal 202 takes zero, the phase of the optical signal takes zero and the intensity of the light beam becomes the highest. When the driving signal 202 takes one, the phase of the optical signal takes π and the intensity of the light beam becomes the highest.

The transmission property 201 can be adjusted by controlling the bias voltage applied to the DC electrodes 121b and 122b. For example, when the transmission property 201 is shifted to the right or left in FIG. 2 due to the manufacture dispersion or use for a long time and the optical intensity does not become the highest for the driving signal that takes zero or one, adjustment can be executed such that the optical intensity becomes the highest for the driving signal that takes zero or one, by controlling the bias voltage.

Figure 3:
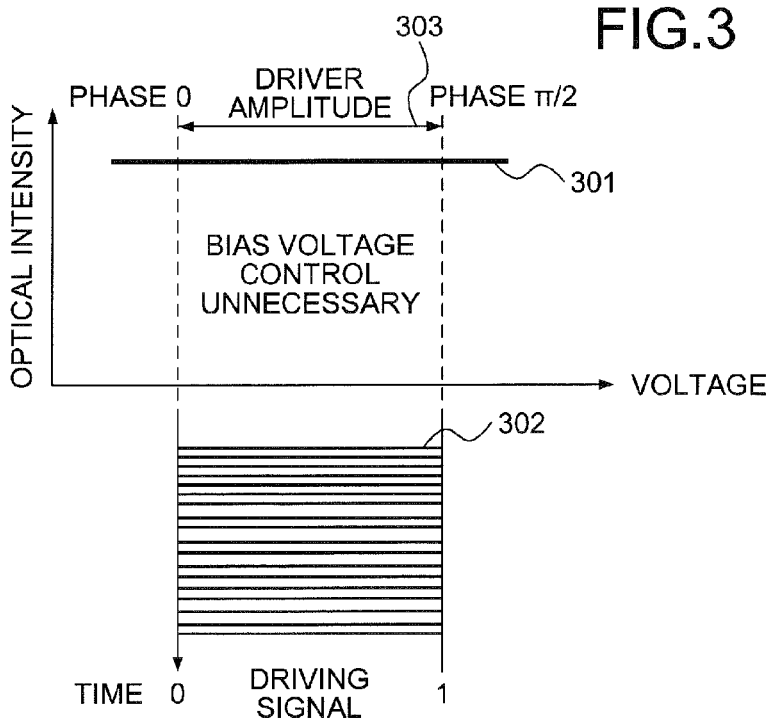
FIG. 3 is a diagram of an example of the relation between the intensity of the optical signal after being transmitted by a phase modulator and the driving signal.

FIG. 3 is a diagram of an example of the relation between the intensity of the optical signal after being transmitted by the phase modulator and the driving signal. In FIG. 3, the horizontal axis represents the voltage of the driving signal input into the phase modulators 131 and 132 and the vertical axis represents the intensity (optical intensity) of the optical signals after being transmitted by the phase modulators 131 and 132. A driving signal 302 represents the driving signal input into the phase modulators 131 and 132. A driver amplitude 303 represents the amplitude of the driving signal 302.

A transmission property 301 represents the transmission property of the light beam of each of the phase modulators 131 and 132 to the voltage of the driving signal input into the phase modulators 131 and 132. As depicted by the transmission property 301, the intensity is always constant (the highest) regardless of the voltage of the driving signal input into the phase modulators 131 and 132.

For example, even when the transmission property 301 is shifted to the right or left in FIG. 3 due to the manufacture dispersion or use for a long time, the optical intensity is not varied. Therefore, with the phase modulators 131 and 132, the optical intensity becomes the highest for the driving signal 202 that takes zero and one even when control of the bias voltage is not executed as executed for the Mach-Zehnder modulators 121 and 122 (see, e.g., FIG. 2).

The Mach-Zehnder modulators 121 and 122 will be described with reference to FIGS. 4A to 6B. Any one of aspects of the Mach-Zehnder modulators 121 and 122 depicted in FIGS. 4A to 6B only has to be used. An aspect depicted in, for example, FIG. 4A is used in the first embodiment.

Figure 4A:
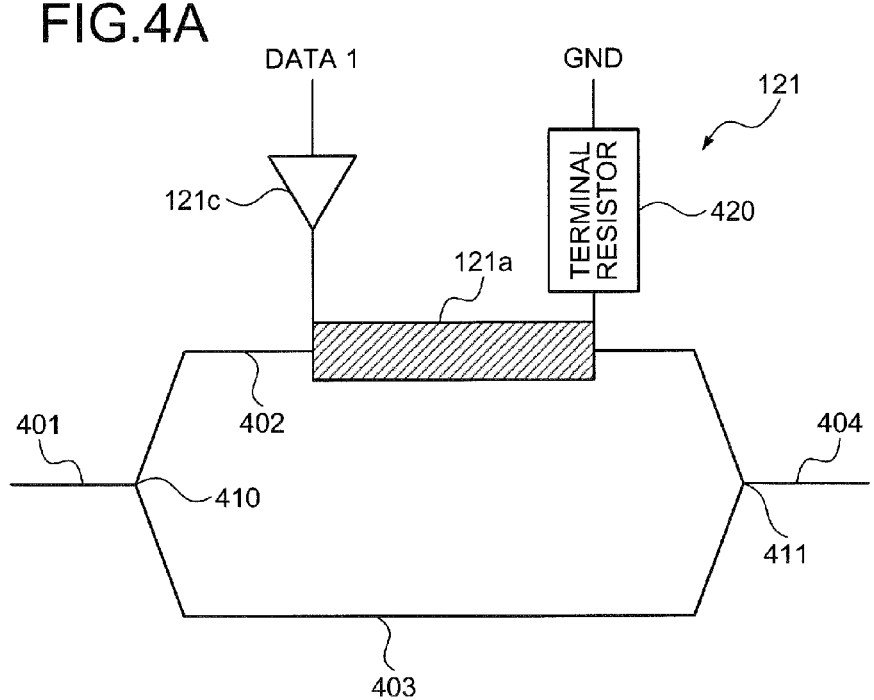
FIG. 4A is a diagram of an example of a specific configuration of the Mach-Zehnder modulator including a Y-branch.
Figure 4B:
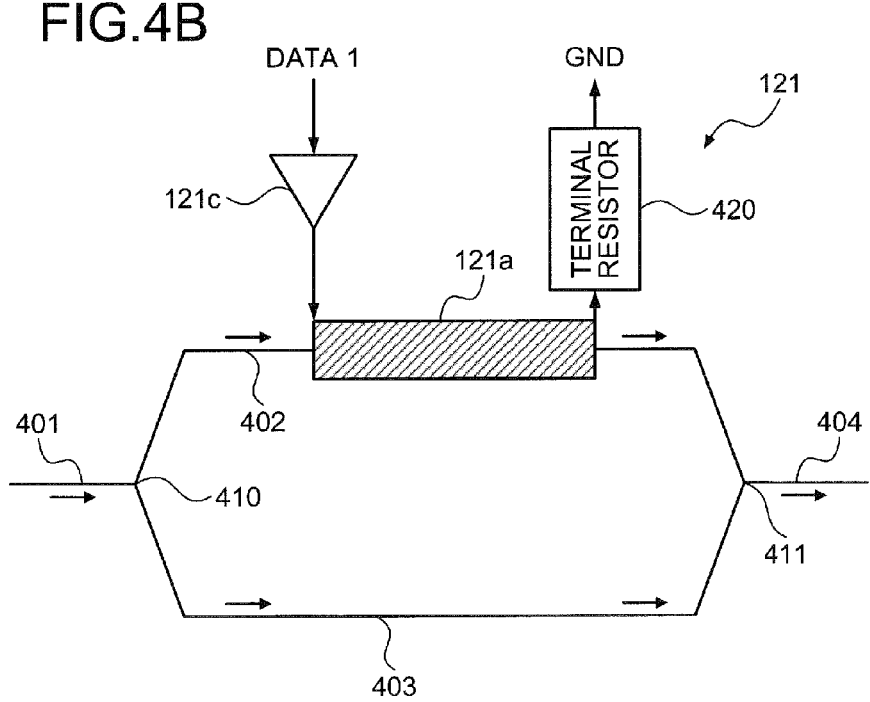
FIG. 4B is a diagram of an example of flows of light beams and electric signals in the Mach-Zehnder modulator depicted in FIG. 4A.

FIG. 4A is a diagram of an example of a specific configuration of the Mach-Zehnder modulator including a Y-branch. FIG. 4B is a diagram of an example of flows of light beams and electric signals in the Mach-Zehnder modulator depicted in FIG. 4A. In FIGS. 4A and 4B, configurations same as the configurations depicted in FIGS. 1A and 1B are given the same reference numerals and will not again be described. The specific configuration of the Mach-Zehnder modulator 121 will be described. However, the specific configuration of the Mach-Zehnder modulator 122 is same as this configuration. As depicted in FIGS. 4A and 4B, the Mach-Zehnder modulator 121 includes optical waveguides 401, 402, 403, and 404, a Y-branch 410, and a Y-coupler 411.

The optical waveguide 401 transmits the light beam output from the branch 110 (see, e.g., FIGS. 1A and 1B) and outputs the light beam to the Y-branch 410. The Y-branch 410 is an optical waveguide formed in a Y-shape and branches the light beam output from the optical waveguide 401 to the optical waveguides 402 and 403.

The optical waveguide 402 transmits the light beam output from the Y-branch 410 and outputs the light beam to the Y-coupler 411. The optical waveguide 403 transmits the light beam output from the Y-branch 410 and outputs the light beam to the Y-coupler 411. The Y-coupler 411 is an optical waveguide formed in a Y-shape, couples the light beams output from the optical waveguides 402 and 403, and outputs the coupled light beam to the optical waveguide 404. The optical waveguide 404 outputs the light beam output from the Y-coupler 411, to the phase modulator 131 (see, e.g., FIGS. 1A and 1B).

The RF electrode 121a is formed on the optical waveguide 402 by, for example, gold evaporation. One end of the RF electrode 121a is connected to the driving unit 121c and the other end thereof is connected to the ground (GND) through a terminal resistor 420.

With the above configuration, the driving unit 121c can: generate the driving signal that corresponds to the data 1 input thereinto; apply the driving signal to the RF electrode 121a; and modulate the phase of the light beam output from the Y-branch 410 and transmitted by the optical waveguide 402. Thus, the phase difference between the light beams coupled by the Y-coupler 411 can be controlled and the two-value phase modulation can be executed.

Figure 5A:
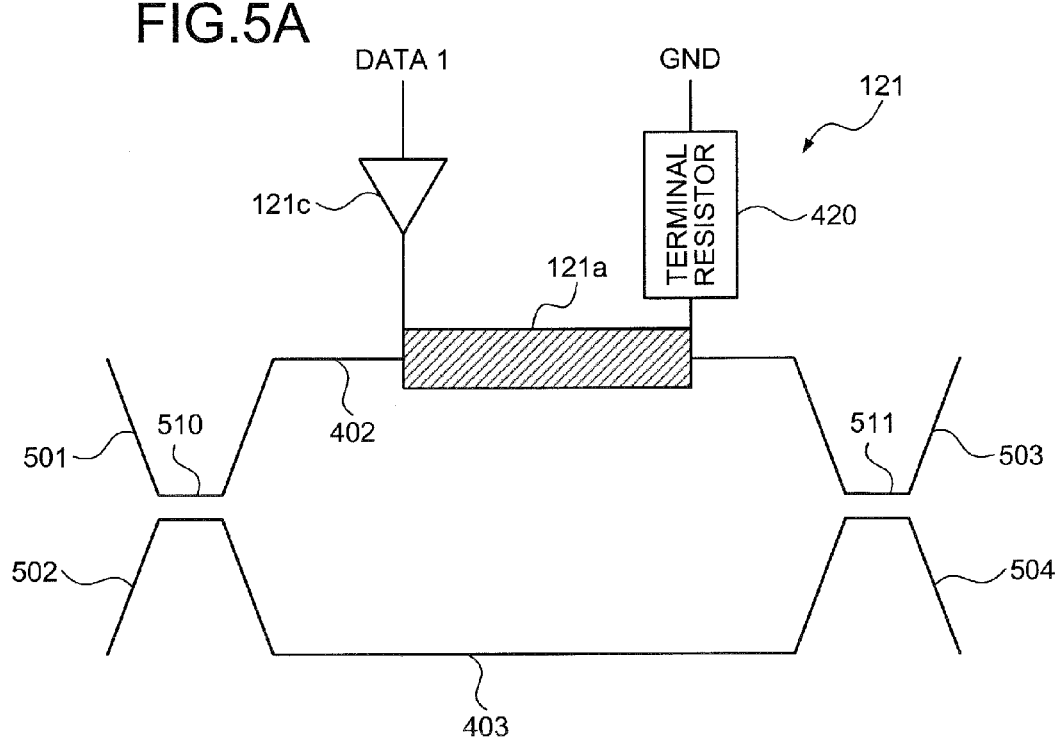
FIG. 5A is a diagram of an example of a specific configuration of the Mach-Zehnder modulator including a directional coupler.
Figure 5B:
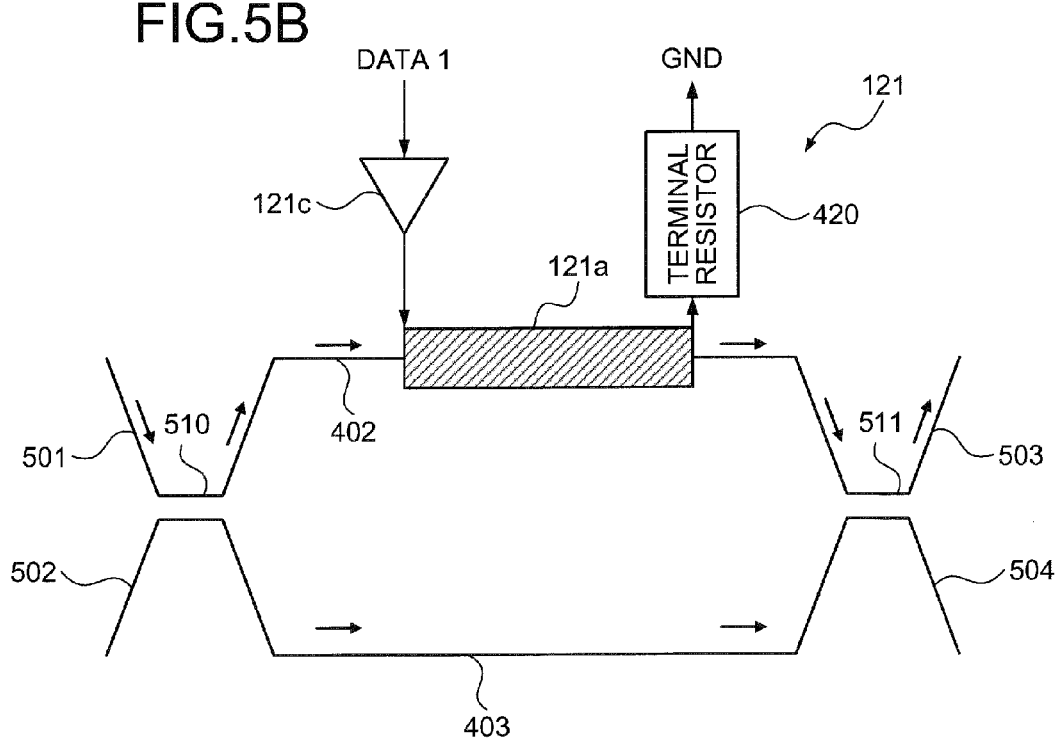
FIG. 5B is a diagram of an example of flows of light beams and electric signals in the Mach-Zehnder modulator depicted in FIG. 5A.

FIG. 5A is a diagram of an example of a specific configuration of the Mach-Zehnder modulator including a directional coupler. FIG. 5B is a diagram of an example of flows of light beams and electric signals in the Mach-Zehnder modulator depicted in FIG. 5A. In FIGS. 5A and 5B, configurations same as the configurations depicted in FIGS. 1A, 1B, 4A, and 4B are given the same reference numerals and will not again be described. As depicted in FIGS. 5A and 5B, the Mach-Zehnder modulator 121 may include directional couplers 510 and 511 instead of the Y-branch 410 and the Y-coupler 411 depicted in FIGS. 4A and 4B.

The directional coupler 510 is provided to: cause light beams input thereinto from optical waveguides 501 and 502 to interfere with each other; and output the light beams acquired by the interference from the optical waveguides 402 and 403. However, in this case, for example, the light beam is input from the optical waveguide 501 and no light beam is input from the optical waveguide 502. Thus, the light beam input from the optical waveguide 501 can be branched and output from the optical waveguides 402 and 403.

The directional coupler 511 is provided to: cause light beams input thereinto from optical waveguides 402 and 403 to interfere with each other; and output the light beams acquired by the interference from optical waveguides 503 and 504. For example, the light beam output from the optical waveguide 503 is output to the phase modulator 131 and the light beam output from the optical waveguide 504 is discarded.

With the above configuration, the driving unit 121c can: generate the driving signal that corresponds to the data 1 input thereinto; apply the driving signal to the RF electrode 121a; and modulates the phase of the light beam output from the directional coupler 510 and transmitted by the optical waveguide 402. Thus, the phase difference between the light beams output from the directional coupler 511 can be controlled and the two-value phase modulation can be executed.

Figure 6A:
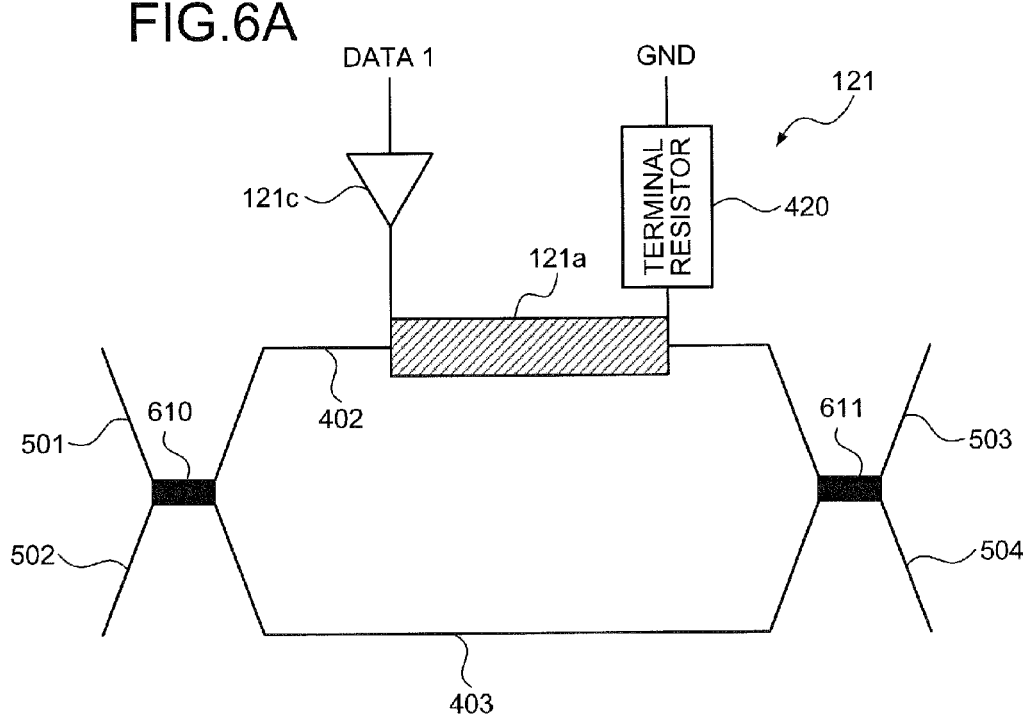
FIG. 6A is a diagram of an example of a specific configuration of the Mach-Zehnder modulator including a multimode interference (MMI)
Figure 6B:
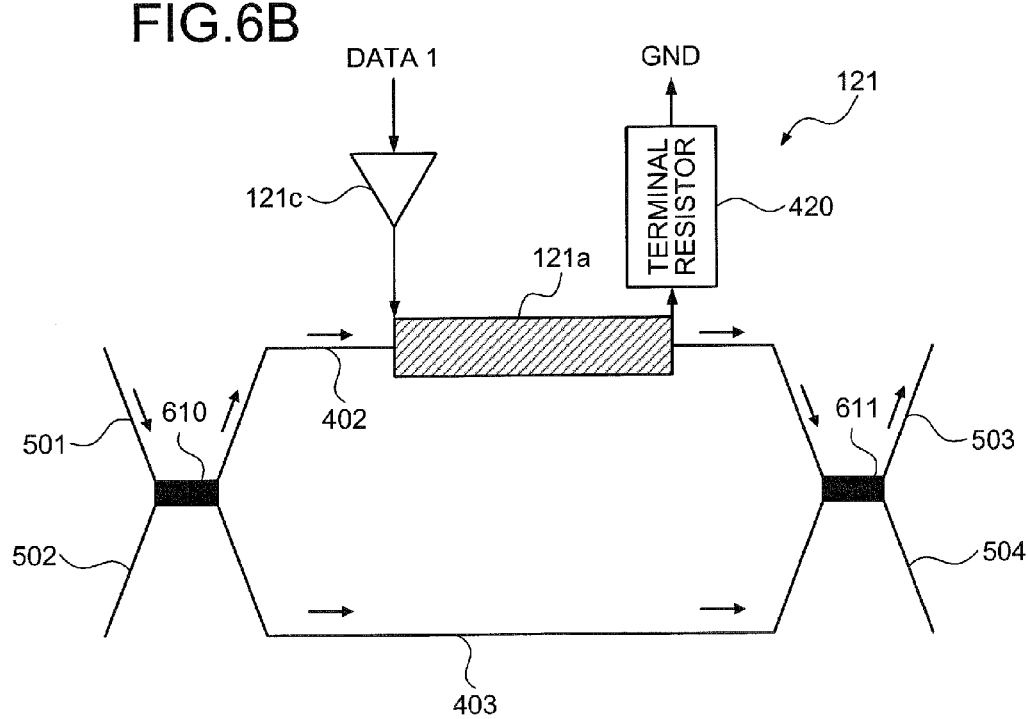
FIG. 6B is a diagram of an example of flows of light beams and electric signals in the Mach-Zehnder modulator depicted in FIG. 6A.

FIG. 6A is a diagram of an example of a specific configuration of the Mach-Zehnder modulator including a multi-mode interference (MMI). FIG. 6B is a diagram of an example of flows of light beams and electric signals in the Mach-Zehnder modulator depicted in FIG. 6A. In FIGS. 6A and 6B, configurations same as the configurations depicted in FIGS. 1A, 1B, and 4A to 5B are given the same reference numerals and will not again be described. As depicted in FIGS. 6A and 6B, the Mach-Zehnder modulator 121 may include MMI couplers 610 and 611 instead of the Y-branch 410 and the Y-coupler 411 depicted in FIGS. 4A and 4B.

The MMI coupler 610 is provided to: cause light beams input thereinto from optical waveguides 501 and 502 to interfere with each other; and output the light beams acquired by the interference from the optical waveguides 402 and 403. However, in this case, for example, the light beam is input from the optical waveguide 501 and no light beam is input from the optical waveguide 502. Thus, the light beam input from the optical waveguide 501 can be branched and output from the optical waveguides 402 and 403.

The MMI coupler 611 is provided to: cause light beams input thereinto from optical waveguides 402 and 403 to interfere with each other; and output the light beams acquired by the interference from optical waveguides 503 and 504. For example, the light beam output from the optical waveguide 503 is output to the phase modulator 131 and the light beam output from the optical waveguide 504 is discarded.

With the above configuration, the driving unit 121c can: generate the driving signal that corresponds to the data 1 input thereinto; apply the driving signal to the RF electrode 121a; and modulates the phase of the light beam output from the MMI coupler 610 and transmitted by the optical waveguide 402. Thus, the phase difference between the light beams output from the MMI coupler 611 can be controlled and the two-value phase modulation can be executed.

Figure 7A:
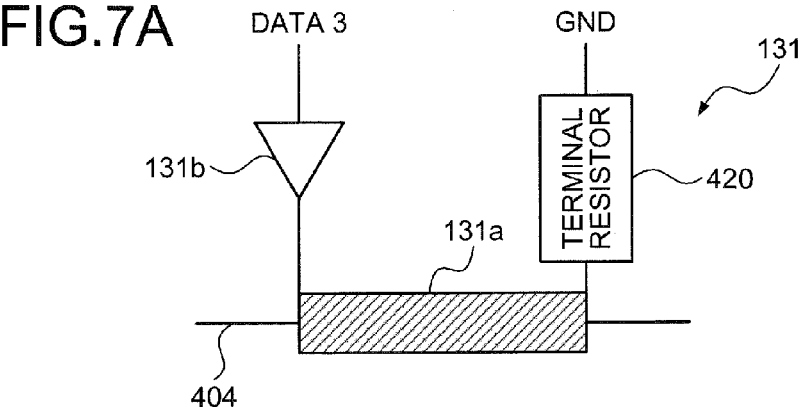
FIG. 7A is a diagram of an example of a specific configuration of the phase modulator.
Figure 7B:
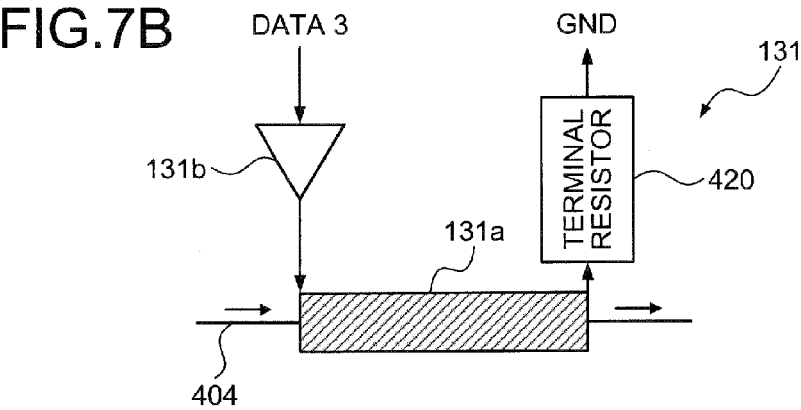
FIG. 7B is a diagram of an example of flows of light beams and electric signals in the phase modulator depicted in FIG. 7A.

FIG. 7A is a diagram of an example of a specific configuration of the phase modulator. FIG. 7B is a diagram of an example of flows of light beams and electric signals in the phase modulator depicted in FIG. 7A. In FIGS. 7A and 7B, configurations same as the configurations depicted in FIGS. 1A and 1B are given the same reference numerals and will not again be described. The specific configuration of the phase modulator 131 will be described. However, the specific configuration of the phase modulator 132 is same as this configuration.

As depicted in FIGS. 7A and 7B, the phase modulator 131 includes the optical waveguide 404 and the RF electrode 131a. The RF electrode 131a is formed on the optical waveguide 404 by, for example, gold evaporation. One end of the RF electrode 131a is connected to the driving unit 131b and the other end thereof is connected to the ground (GND) through the terminal resistor 420. An optical signal of which phase is modulated by the phase modulator 131 is output to the phase shifter 141 or the attenuator 142.

With the above configuration, the driving unit 131b can: generate the driving signal that corresponds to the data 3 input thereinto; apply the driving signal to the RF electrode 131a; and modulate the phase of the light beam transmitted by the optical waveguide 404. Thus, the phase modulator 131 can execute four-value phase modulation for the optical signal output from the Mach-Zehnder modulator 121 corresponding to the driving signal applied to the RF electrode 131a.

The optical waveguide 404 can realize one optical waveguide that achieves an electro-optical effect. The RF electrode 131a can realize an electrode that applies an electric field corresponding to a voltage applied thereto, to an optical waveguide.

Figure 8A:
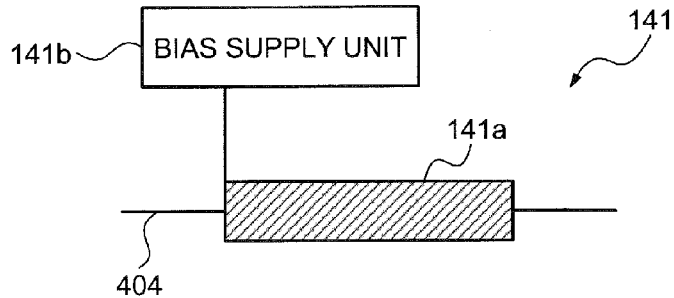
FIG. 8A is a diagram of an example of a specific configuration of a phase shifter.
Figure 8B:
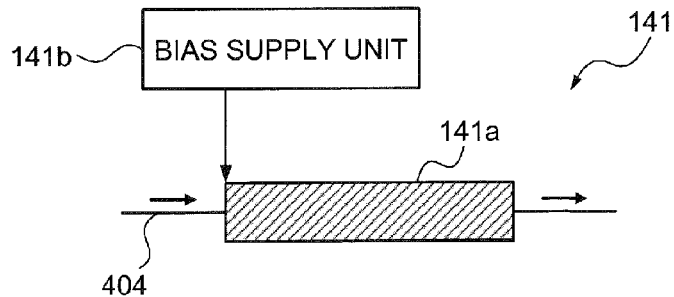
FIG. 8B is a diagram of an example of flows of light beams and electric signals in the phase shifter depicted in FIG. 8A.

FIG. 8A is a diagram of an example of a specific configuration of the phase shifter. FIG. 8B is a diagram of an example of flows of light beams and electric signals in the phase shifter depicted in FIG. 8A. In FIGS. 8A and 8B, configurations same as the configurations depicted in FIGS. 1A and 1B are given the same reference numerals and will not again be described. As depicted in FIGS. 8A and 8B, the phase shifter 141 includes the optical waveguide 404 and the DC electrode 141a.

The DC electrode 141a is formed on the optical waveguide 404 by, for example, gold evaporation. One end of the DC electrode 141a is connected to the bias supply unit 141b. The optical signal to which the bias is applied by the DC electrode 141a is output to the coupler 150.

With the above configuration, the bias supply unit 141b can correct the shift of the phase between the optical signal output from the phase shifter 141 to the coupler 150 and the optical signal output from the attenuator 142 to the coupler 150.

Figure 9A:
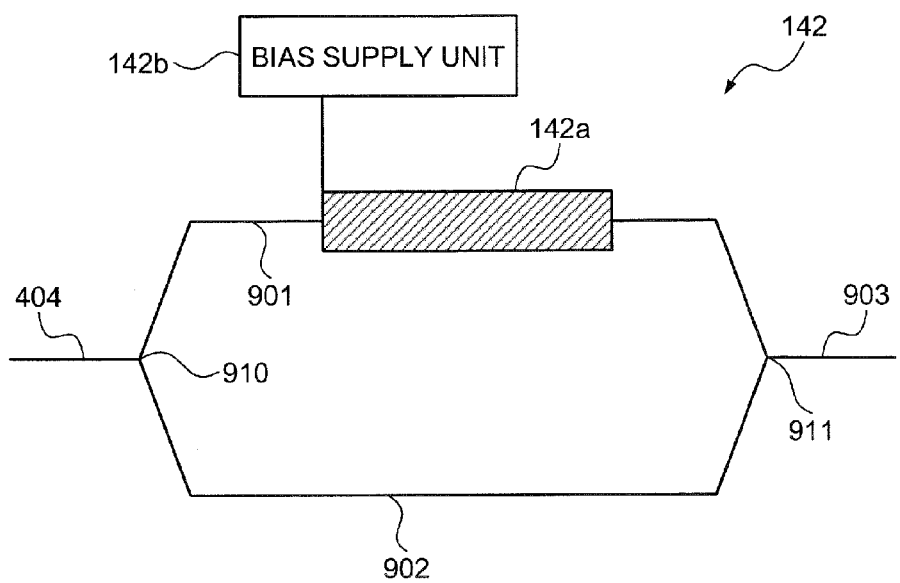
FIG. 9A is a diagram of an example of a specific configuration of the attenuator including the Y-branch.

A specific configuration of the attenuator 142 will be described with reference to FIGS. 9A to 11A. Any one of aspects of the attenuator 142 depicted in FIGS. 9A to 11A only has to be used. An aspect depicted in FIG. 9A is used in the first embodiment. For example, a Mach-Zehnder modulator can be used as the attenuator 142.

Figure 9B:
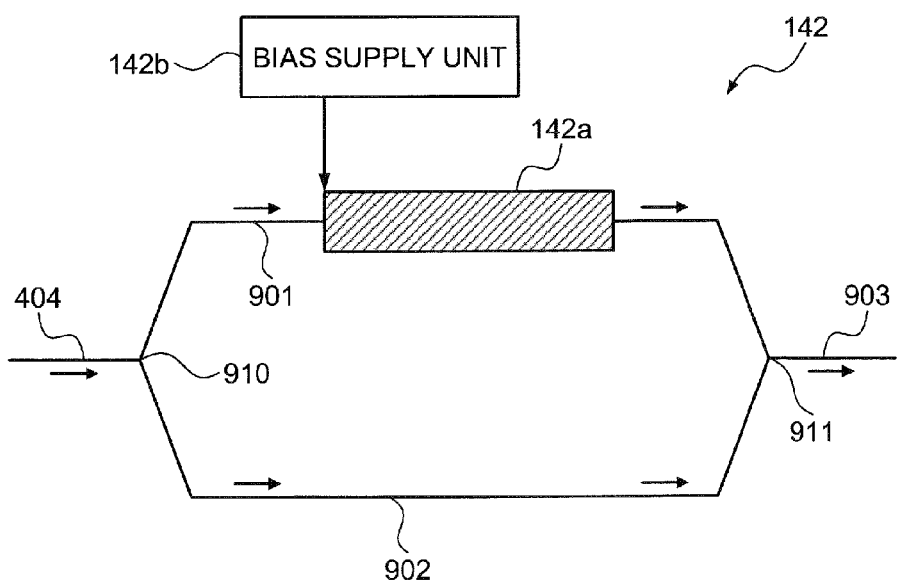
FIG. 9B is a diagram of an example of flows of light beams and electric signals in the attenuator depicted in FIG. 9A.

FIG. 9A is a diagram of an example of a specific configuration of the attenuator including the Y-branch. FIG. 9B is a diagram of an example of flows of light beams and electric signals in the attenuator depicted in FIG. 9A. In FIGS. 9A and 9B, configurations same as the configurations depicted in FIGS. 1A and 1B are given the same reference numerals and will not again be described. As depicted in FIGS. 9A and 9B, the attenuator 142 includes the optical waveguide 404, a Y-branch 910, optical waveguides 901, 902, and 903, and a Y-coupler 911.

The optical waveguide 404 transmits the light beam output from the phase modulator 132 (see, e.g., FIGS. 1A and 1B) and outputs the light beam to the Y-branch 910. The Y-branch 910 is an optical waveguide formed in a Y-shape and branches the light beam output from the optical waveguide 404 to the optical waveguides 901 and 902.

The optical waveguide 901 transmits the light beam output from the Y-branch 910 and outputs the light beam to the Y-coupler 911. The optical waveguide 902 transmits the light beam output from the Y-branch 910 and outputs the light beam to the Y-coupler 911. The Y-coupler 911 is an optical waveguide formed in a Y-shape. The Y-coupler 911 couples the light beams output from the optical waveguides 901 and 902 and outputs the coupled light beam to the optical waveguide 903. The optical waveguide 903 outputs the light beam output from the Y-coupler 911, to the coupler 150 (see, e.g., FIGS. 1A and 1B).

The DC electrode 142a is formed on the optical waveguide 901 by, for example, gold evaporation. One end of the DC electrode 142a is connected to the bias supply unit 142b. With this configuration, the bias supply unit 142b can apply a bias to the DC electrode 142a and attenuate by 6 [dB] the intensity of the optical signal output from the Y-branch 910 and transmitted by the optical waveguide 901.

Figure 10A:
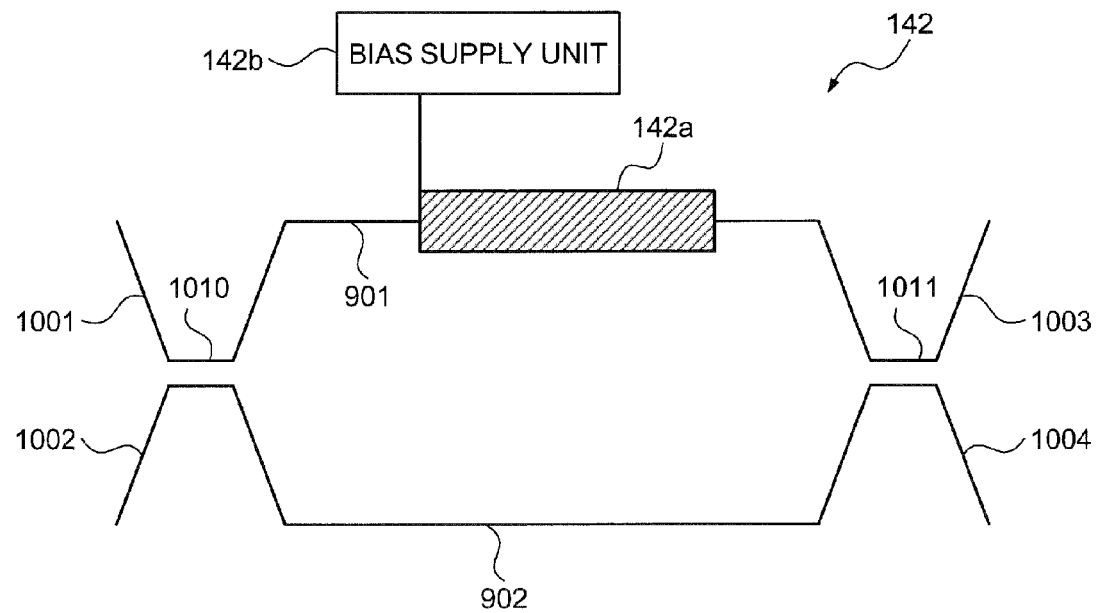
FIG. 10A is a diagram of an example of a specific configuration of the attenuator including the directional coupler.
Figure 10B:
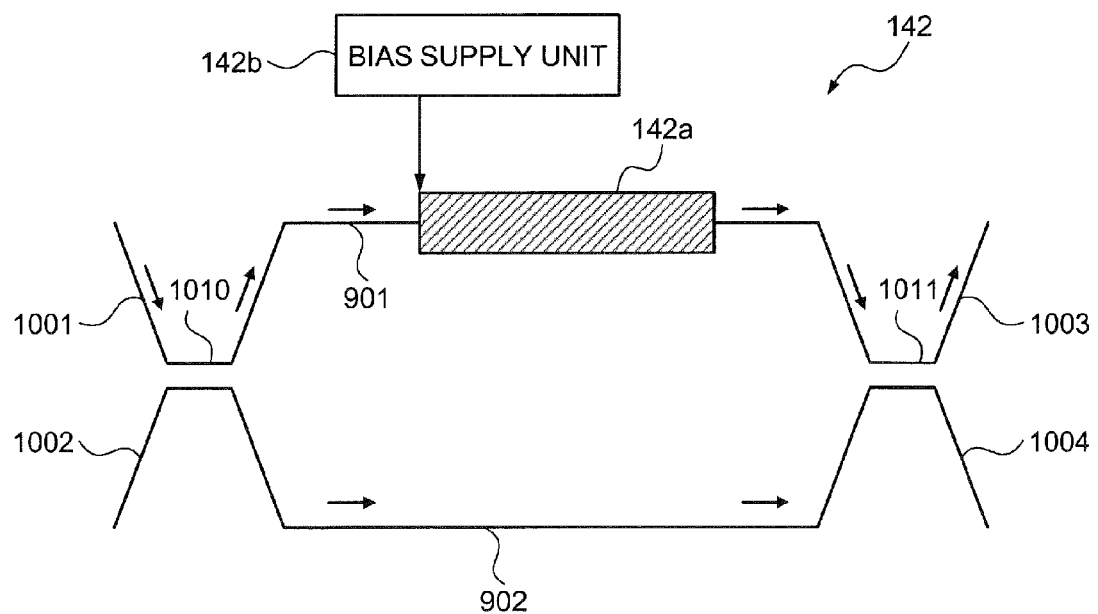
FIG. 10B is a diagram of an example of flows of light beams and electric signals in the attenuator depicted in FIG. 10A.

FIG. 10A is a diagram of an example of a specific configuration of the attenuator including the directional coupler. FIG. 10B is a diagram of an example of flows of light beams and electric signals in the attenuator depicted in FIG. 10A. In FIGS. 10A and 10B, configurations same as the configurations depicted in FIGS. 1A, 1B, 9A, and 9B are given the same reference numerals and will not again be described. As depicted in FIGS. 10A and 10B, the attenuator 142 may include directional couplers 1010 and 1011 instead of the Y-branch 910 and the Y-coupler 911 depicted in FIGS. 9A and 9B.

The directional coupler 1010 is provided to cause the light beams input thereinto from optical waveguides 1001 and 1002 to interfere with each other and output the light beams acquired by the interference from the optical waveguides 901 and 902. However, in this case, for example, the light beam is input from the optical waveguide 1001 and no light beams is input from the optical waveguide 1002 into the directional coupler 1010. Thus, the directional coupler 1010 can branch the light beam input from the optical waveguide 1001 and can output the branched light beams from the optical waveguides 901 and 902.

The directional coupler 1011 is provided to cause the light beams input thereinto from optical waveguides 1001 and 1002 to interfere with each other and output the light beams acquired by the interference from optical waveguides 1003 and 1004. For example, the light beam output from the optical waveguide 1003 is output to the coupler 150 and the light beam output from the optical waveguide 1004 is discarded.

With the above configuration, the bias supply unit 142b can apply the bias to the DC electrode 142a and attenuate by 6 [dB] the intensity of the optical signal output from the directional coupler 1010 and transmitted by the optical waveguide 901.

Figure 11A:
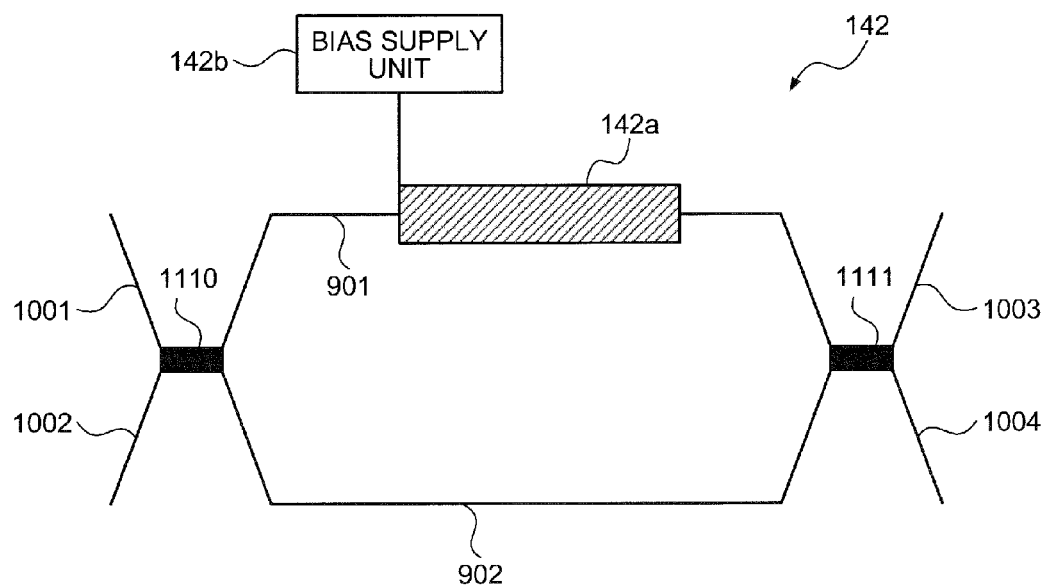
FIG. 11A is a diagram of an example of a specific configuration of the attenuator including the MMI coupler.
Figure 11B:
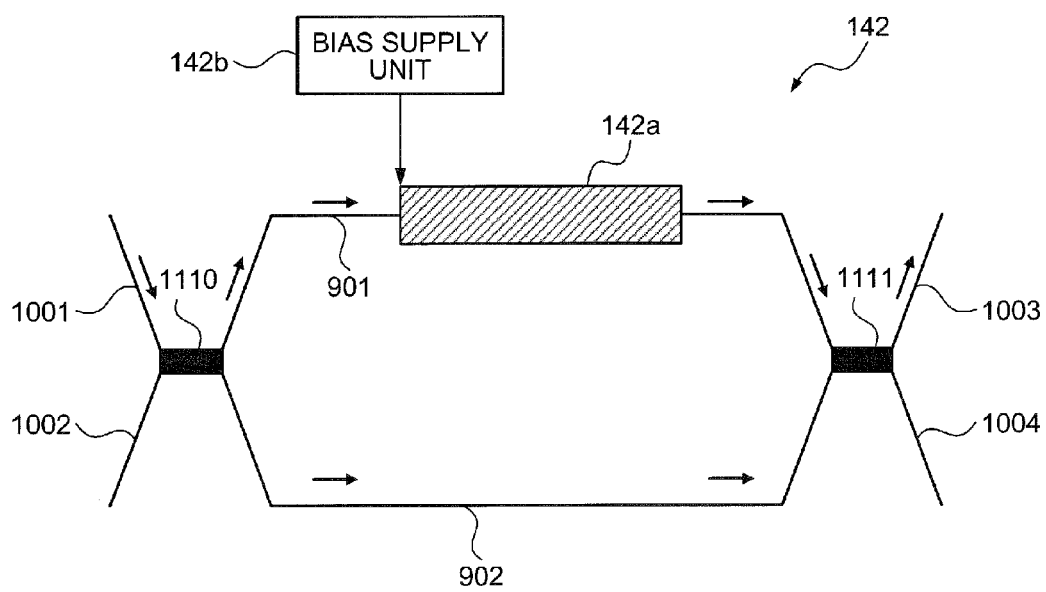
FIG. 11B is a diagram of an example of flows of light beams and electric signals in the attenuator depicted in FIG. 11A.

FIG. 11A is a diagram of an example of a specific configuration of the attenuator including the MMI coupler. FIG. 11B is a diagram of an example of flows of light beams and electric signals in the attenuator depicted in FIG. 11A. In FIGS. 11A and 11B, configurations same as the configurations depicted in FIGS. 1A, 1B, and 9A to 10B are given the same reference numerals and will not again be described. As depicted in FIGS. 11A and 11B, the attenuator 142 may include MMI couplers 1110 and 1111 instead of the Y-branch 910 and the Y-coupler 911 depicted in FIGS. 9A and 9B.

The MMI coupler 1110 is provided to cause the light beams input thereinto from optical waveguides 1001 and 1002 to interfere with each other and output the light beams acquired by the interference from the optical waveguides 901 and 902. However, in this case, for example, the light beam is input from the optical waveguide 1001 and no light beams is input from the optical waveguide 1002 into the directional coupler 1010. Thus, the directional coupler 1010 can branch the light beam input from the optical waveguide 1001 and can output the branched light beams from the optical waveguides 901 and 902.

The MMI coupler 1111 is provided to cause the light beams input thereinto from optical waveguides 1001 and 1002 to interfere with each other and output the light beams acquired by the interference from optical waveguides 1003 and 1004. For example, the light beam output from the optical waveguide 1003 is output to the coupler 150 and the light beam output from the optical waveguide 1004 is discarded.

With the above configuration, the bias supply unit 142b can apply the bias to the DC electrode 142a and attenuate by 6 [dB] the intensity of the optical signal output from the MMI coupler 1110 and transmitted by the optical waveguide 901.

The configuration of the Mach-Zehnder attenuator 142 has been described with reference to FIGS. 9A to 11B. However, not limited to the one of the Mach-Zehnder type, any one of various types of attenuator can be used as the attenuator 142.

Figure 12A:
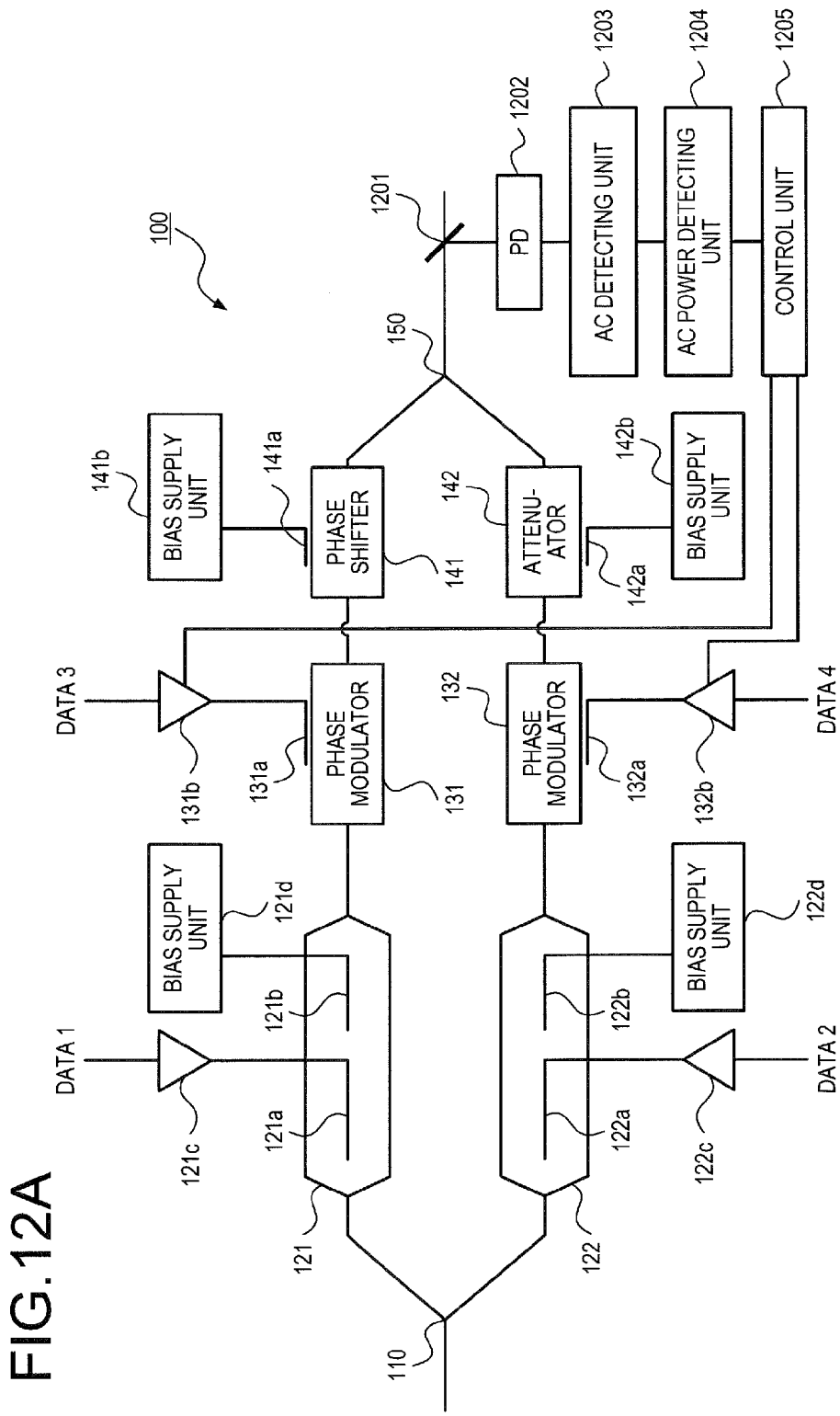
FIG. 12A is a diagram of an example of the configuration to control a driving unit of the phase modulator.
Figure 12B:
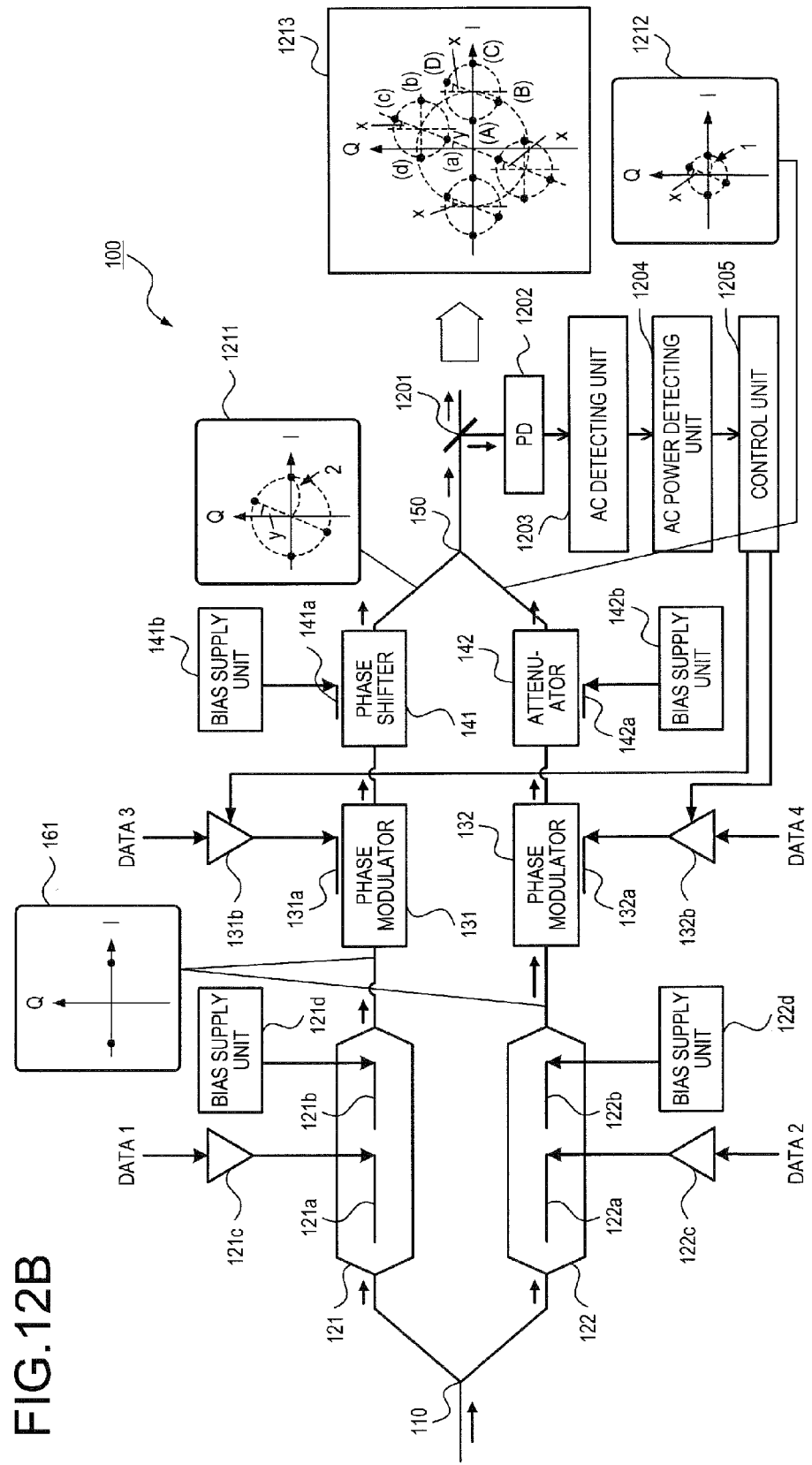
FIG. 12B is a diagram of an example of flows of light beams and electric signals in the configuration to control the driving unit depicted in FIG. 12A.

FIG. 12A is a diagram of an example of the configuration to control the driving unit of the phase modulator. FIG. 12B is a diagram of an example of flows of light beams and electric signals in the configuration to control the driving unit depicted in FIG. 12A. In FIGS. 12A and 12B, configurations same as the configurations depicted in FIGS. 1A and 1B are given the same reference numerals and will not again be described. As depicted in FIGS. 12A and 12B, the modulating apparatus 100 includes a coupler 1201, a photo detector (PD) 1202, an alternating current (AC) detecting unit 1203, an AC power detecting unit 1204, and a control unit 1205.

The coupler 1201 partially branches the light beam output from the coupler 150 and outputs the partially branched light beam to the PD 1202. The PD 1202 executes photo-electric conversion to the light beam output from the coupler 1201. The PD 1202 outputs the electric signal acquired by the photo-electric conversion to the AC current detecting unit 1203.

The AC current detecting unit 1203 detects the average AC current of the electric signal output from the PD 1202. The AC current detecting unit 1203 outputs the detected average AC current to the AC power detecting unit 1204. The AC power detecting unit 1204 detects the average AC power based on the average AC current output from the AC current detecting unit 1203. The AC power detecting unit 1204 outputs the detected average AC power to the control unit 1205.

The control unit 1205 controls the driving units 131b and 132b using the average AC power output from the AC power detecting unit 1204 and can be realized by a control circuit such as, for example, a central processing unit (CPU). The PD 1202, the AC current detecting unit 1203, and the AC power detecting unit 1204 can realize a detecting unit that detects a shift of the phase modulation amount caused by the third and the fourth modulating units based on the light beam coupled by the coupler.

The control for the driving units 131b and 132b will be described in detail with reference to constellations 1211 to 1213. In the constellation 1211, a phase error of each symbol from $\pi/2$ is represented as y [deg]. In the constellation 1212, a phase error of each symbol from $\pi/2$ is represented as x [deg]. Assuming that all the 16 symbols in the constellation 1213 are present at an equal probability, AC currents and the average AC currents are as follows that are monitored by the PD 1202 and the AC current detecting unit 1203 for the symbols (A) to (D) and (a) to (d) in the constellation 1213.

$1^2=1$ (A)

$(2-\sin x)^2+\cos x^2=5-4\sin x$ (B)

$3^2=9$ (C)

$(2+\sin x)^2+\cos x^2=5+4\sin x$ (D)

$(2\sin y-\sin x)^2+(2\cos y-\cos x)^2=5-4\sin x\sin y-4\cos x\cos y$ (a)

$(2\sin y+1)^2+(2\cos y)^2=5+4\sin y$ (b)

$(2\sin y+\sin x)^2+(2\cos y+\cos x)^2=5+4\sin x\sin y+4\cos x\cos y$ (c)

$(2\sin y-1)^2+(2\cos y)^2=5-4\sin y$ (d)

Average AC Current=$((A)+(B)+(C)+(D)+(a)+(b)+(c)+(d))/8=5$

However, the radius of the constellation 1213 is defined to be one. The symbols are symmetrical about the origin in the constellation 1213 and, therefore, symbols other than the symbols (A) to (D) and (a) to (d) will not be described. The values that can be taken by the current detected by the PD 1202 and the AC current detecting unit 1203 are the eight discrete values.

The AC power monitored by the AC power detecting unit 1204 means the AC power acquired by squaring the value acquired by subtracting the average AC current from the AC current. The average AC power represents the average of the eight pieces of AC power. Therefore, the AC currents and the average power form the following ratios, that are monitored by the AC power detecting unit 1204 at the symbols (A) to (D) and (a) to (d) in the constellation 1213.

$((A)-5)^5 \ldots (-4)^2 = 16$
$((B)-5)^2 \ldots (-4\sin x)^2 = 16\sin x^2$ $((C)-5)^2 \ldots (4)^2 = 16$
$((D)-5)^2 \ldots (4\sin x)^2 = 16\sin x^2$ $((a)-5)^2 \ldots (4\sin x\sin y+4\cos x\cos y)^2$
$((b)-5)^2 \ldots (4\sin y)^2 = 16\sin y^2$ $((c)-5)^2 \ldots (4\sin x\sin y+4\cos x\cos y)^2$
$((d)-5)^2 \ldots (4\sin y)^2 = 16\sin y^2$ $$\text{Average AC Power} = \left\{ \begin{array}{l} ((A)-5)^2+((B)-5)^2+ \\ ((C)-5)^2+((D)-5)^2+ \\ ((a)-5)^2+((b)-5)^2+ \\ ((c)-5)^2+((d)-5)^2 \end{array} \right\} /8$$

$= 4+4\sin x^2+4\sin y^2+4\sin x^2 \times \sin y^2 +$
$\quad 4\cos x^2 \times \cos y^2 + 8\sin x \times \cos x \times \sin y \times \cos y$
$= 10-2\cos 2y-2(1-\cos 2y)\times\cos 2x +$
$\quad 2\sin 2x \times \sin 2y$ "x" and "y" are errors and it can be considered that these errors are significantly small. Therefore, 1−cos 2y>0, cos 2x>0, sin 2y>0, sin 2x>0 are acquired. The third term of the equation is a negative number and the fourth term thereof is a positive number. Thus, when the average AC power monitored by the AC power detecting unit 1204 is controlled to be reduced to its minimal value, the "cos 2x" of the third term is controlled to be increased to its maximal value and the "sin 2x" of the fourth term is controlled to be reduced to its minimal value. "x" converges to zero. The above equation becomes the same equation when "x" and "y" are exchanged with each other and, therefore, "y" also converges to zero. Therefore, when the average AC power monitored by the AC power detecting unit 1204 is controlled to be reduced to its minimal value, "x" and "y" both converge to zero and the phase error can be controlled to be reduced to its minimal value.

FIG. 13 is a flowchart of a control process for the driving unit of the phase modulator executed by the control unit. As depicted in FIG. 13, the control unit 1205 sets the counter i to be one (step S1301) and determines whether i is equal to or smaller than a desired value p (step S1302). The desired value p is, for example, a value set in advance.

When the control unit 1205 determines that i is equal to or smaller than p (step S1302: YES), the control unit 1205 monitors the average AC power in the previous session (step S1303) and increases by an amplitude variation width Δa an amplitude V3 [mVpp] of the driving signal output by the driving unit 131b (for example, the driver amplitude 303 depicted in FIG. 3) (step S1304). The amplitude variation width Δa is, for example, a value set in advance. The control unit 1205 monitors the current average AC power (step S1305) and determines whether the current average AC power is lower than the average AC power in the previous session (step S1306).

When the control unit 1205 determines at step S1306 that the current average AC power is lower than the average AC power in the previous session (step S1306: YES), the control unit 1205 adds one to the counter i (step S1307) and progresses to the process at step S1302. Thus, when the property is improved by increasing the amplitude V3 at step S1304, the increased amplitude V3 can be maintained.

When the control unit 1205 determines at step S1306 that the current average AC power is equal to or higher than the average AC power in the previous session (step S1306: NO), the control unit 1205 decreases by 2 Δa the amplitude V3 [mVpp] of the driving signal output by the driving unit 131b (step S1308) and progresses to the process at step S1307. Thus, when the property is degraded by increasing the amplitude V3 at step S1304, the increased amplitude V3 can be reduced to an amplitude that is lower than the original amplitude V3.

When the control unit 1205 determines at step S1302 that i exceeds p (step S1302: NO), the control unit 1205 progresses to the process at step S1309. The control unit 1205 sets the counter j to be one (step S1309) and determines whether j is equal to or smaller than the desired value p (step S1310).

When the control unit 1205 determines that j is equal to or smaller than p (step S1310: YES), the control unit 1205 monitors the average AC power of the previous session (step S1311), increases by an amplitude variation width Δb an amplitude V4 [mVpp] of the driving unit 132b (step S1312), monitors the average AC power of the current session (step S1313), and determines whether the average AC power of the current session is lower than the average AC power of the previous session (step S1314).

When the control unit 1205 determines that the average AC power of the current session is lower than the average AC power of the previous session (step S1314: YES), the control unit 1205 adds one to the counter j (step S1315) and progresses to the process at step S1310. When the control unit 1205 determines that the average AC power of the current session is equal to or higher than the average AC power of the previous session (step S1314: NO), the control unit 1205 reduces by 2 Δb the amplitude V4 [mVpp] of the driving unit 132b (step S1316) and progresses to the process at step S1315. When the control unit 1205 determines at step S1310 that j exceeds p (step S1310: NO), the control unit 1205 causes the series of process steps according to the flowchart to come to an end.

With the above process steps, the amplitude of each of the driving signals can be controlled that are input into the phase modulators 131 and 132 such that the average AC power monitored by the AC power detecting unit 1204 is reduced. Thus, the error can be reduced in the phase modulation by the phase modulators 131 and 132.

Thus, in the first embodiment: the Mach-Zehnder modulator 121 and the phase modulator 131 are connected in series and, thereby, the four- or more-value phase modulation can be executed; and the Mach-Zehnder modulator 122 and the phase modulator 132 are connected in series and, thereby, the four- or more-value phase modulation can be executed. The optical signals each applied with the four- or more-value phase modulation are coupled at different intensities and, thereby, the 16- or more-value QAM is enabled.

The phase modulators 131 and 132 do not branch any light beam and do not cause any light beams to interfere with each other and, therefore, their transmission factors are not varied even when any phase shift occurs. Thus, the control of the phase modulators 131 and 132 can be simplified. For example, no bias control needs to be executed for the phase modulators 131 and 132. Therefore, the control of the modulating apparatus 100 can be simplified.

The phase modulators 131 and 132 can execute the phase modulation based on zero or π/2 and, therefore, no π/2 shifter needs to be provided. Thus, the configuration of the modulating apparatus 100 can be simplified.

Figure 14A:
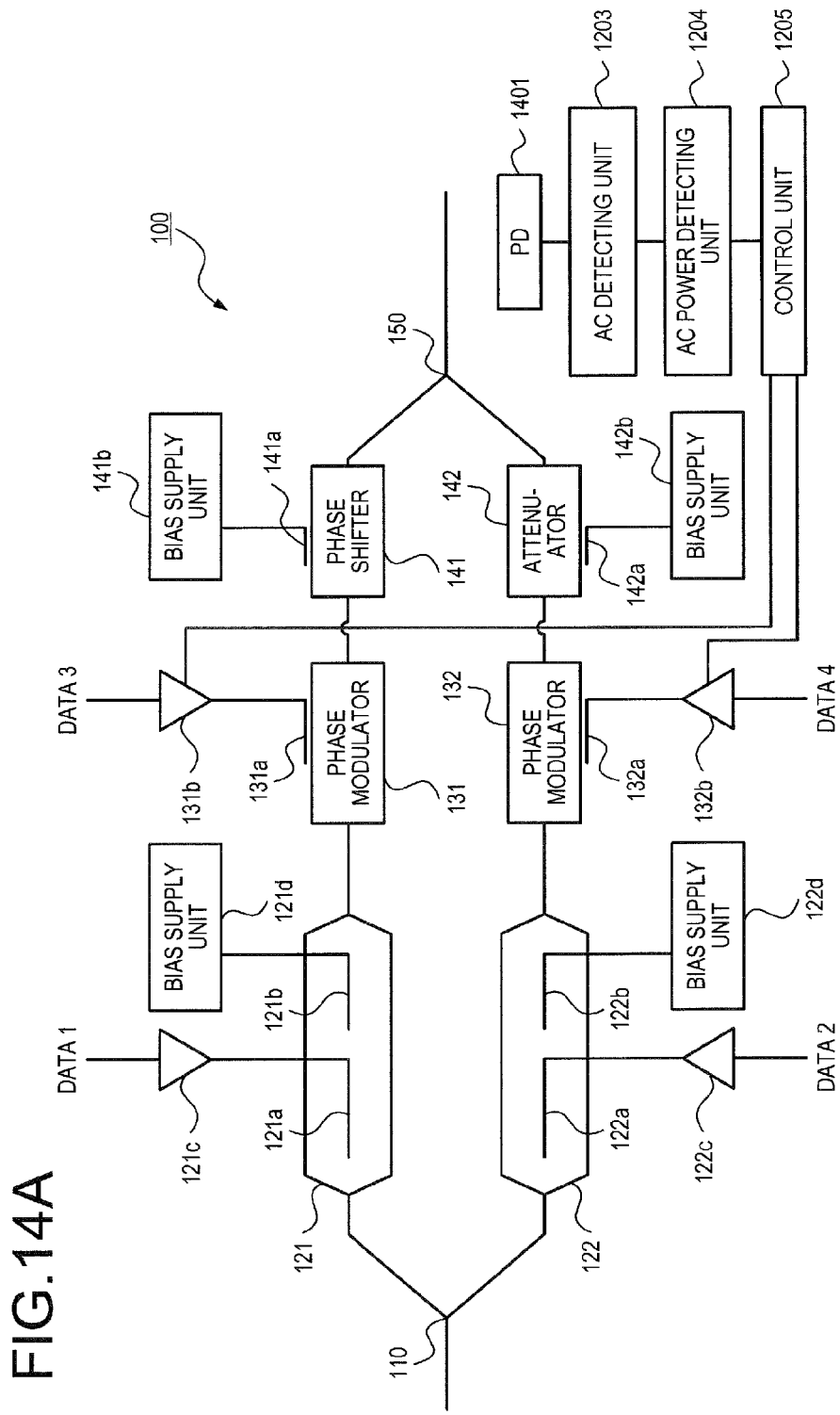
FIG. 14A is a diagram of another example of the configuration to control the driving unit of the phase modulator.
Figure 14B:
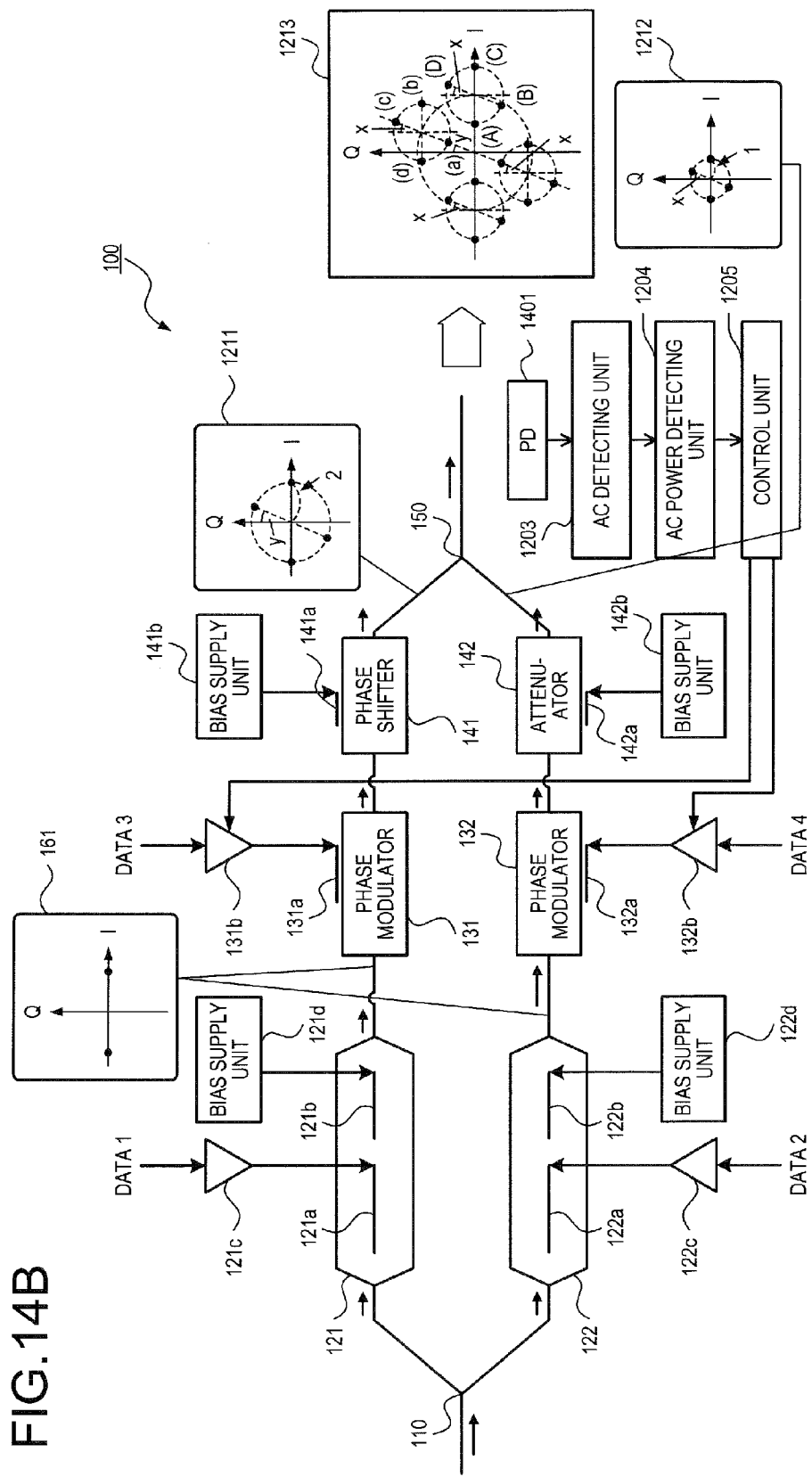
FIG. 14B is a diagram of an example of flows of light beams and electric signals in the configuration to control the driving unit depicted in FIG. 14A.

FIG. 14A is a diagram of another example of the configuration to control the driving unit of the phase modulator. FIG. 14B is a diagram of an example of flows of light beams and electric signals in the configuration to control the driving unit depicted in FIG. 14A. In FIGS. 14A and 14B, configurations same as the configurations depicted in FIGS. 12A and 12B are given the same reference numerals and will not again be described. As depicted in FIGS. 14A and 14B, a PD 1401 monitors an opposite-phase light beam of the coupler 150. For example, the PD 1401 executes photo-electric conversion for the opposite-phase light beam output from the coupler 150. The PD 1401 outputs an electric signal acquired by the photo-electric conversion to the AC current detecting unit 1203.

The control executed for the driving units 131b and 132b will be described in detail. When the opposite-phase light beam is monitored, the control can be executed in the same manner as that for the in-phase light beam. In a constellation 1211, a phase error of each symbol from π/2 is represented by y [deg]. In a constellation 1212, a phase error of each symbol from π/2 is represented by x [deg]. Because of the symmetry about the origin, calculation of (A) to (D) and (a) to (d) will be described. The AC current acquired when the opposite-phase light beam is monitored is a current acquired by subtracting the in-phase light beam from the total light beam intensity and, therefore, the AC current and the average AC current are acquired as follows.

$$9 - 1^2 = 8 \quad (A)$$

$$9 - ((2-\sin x)^2 + \cos x^2) = 4 + 4 \sin x \quad (B)$$

$$9 - 3^2 = 0 \quad (C)$$

$$9 - ((2+\sin x)^2 + \cos x^2) = 4 - 4 \sin x \quad (D)$$

$$9 - ((2 \sin y - \sin x)^2 + (2 \cos y - \cos x)^2) = 4 + 4 \sin x \sin y + 4 \cos x \cos y \quad (a)$$

$$9 - ((2 \sin y + 1)^2 + (2 \cos y)^2) = 4 - 4 \sin y \quad (b)$$

$$9 - ((2 \sin y + \sin x)^2 + (2 \cos y + \cos x)^2) = 4 - 4 \sin x \sin y - 4 \cos x \cos y \quad (c)$$

$$9 - ((2 \sin y - 1)^2 + (2 \cos y)^2) = 4 + 4 \sin y \quad (d)$$

Average Current=$((A)+(B)+(C)+(D)+(a)+(b)+(c)+(d))/8=4$

The AC power and the average AC power at this moment are as follows.

$$((A) - 4)^2 \ldots (4)^2 = 16$$
$$((B) - 4)^2 \ldots (4\sin x)^2 = 16\sin x^2$$
$$((C) - 4)^2 \ldots (-4)^2 = 16$$
$$((D) - 4)^2 \ldots (-4\sin x)^2 = 16\sin x^2$$
$$((a) - 4)^2 \ldots (4\sin x \sin y + 4\cos x \cos y)^2$$
$$((b) - 4)^2 \ldots (-4\sin y)^2 = 16\sin y^2$$
$$((c) - 4)^2 \ldots (4\sin x \sin y + 4\cos x \cos y)^2$$
$$((d) - 4)^2 \ldots (4\sin y)^2 = 16\sin y^2$$

-continued $$\text{Average AC Current} = \left\{\begin{array}{l}((A)-4)^2+((B)-4)^2+\\((C)-4)^2+((D)-4)^2+\\((a)-4)^2+((b)-4)^2+\\((c)-4)^2+((d)-4)^2\end{array}\right\}/8$$

$$= 4 + 4\sin x^2 + 4\sin y^2 + 4\sin x^2 \times \sin y^2 +$$
$$4\cos x^2 \times \cos y^2 + 8\sin x \times \cos x \times \sin y \times \cos y$$
$$= 10 - 2\cos 2y - 2(1 - \cos 2y) \times \cos 2x +$$
$$2\sin 2x \times \sin 2y$$

The completely same calculation result as that of the in-phase light beam is acquired as the average AC power. "x" and "y" are the errors and it can be considered that x and y are significantly smaller than π/4. Therefore, 1−cos 2y>0, cos 2x>0, sin 2y>0, sin 2x>0 are acquired and the third term of the equation is a negative number and the fourth term thereof is a positive number. Thus, when the average AC power is controlled to be reduced to its minimal value, "cos 2x" in the third term is controlled to be increased to its maximal value and "sin 2x" in the fourth term is controlled to be reduced to its minimal value. "x" converges to zero. The above equation becomes the same equation when "x" and "y" are exchanged with each other and, therefore, "y" also converges to zero. Therefore, when the average AC power is controlled to be reduced to its minimal value, "x" and "y" both converge to zero and the phase error can be controlled to be reduced to its minimal value.

Thus, for the case where the opposite-phase light beam is monitored, similarly to the case where the in-phase light beam is monitored, the amplitude of each of the driving signals input into the phase modulators 131 and 132 can be controlled such that the average AC power monitored by the AC power detecting unit 1204 is reduced. Thus, the error of the phase modulation caused by the phase modulators 131 and 132 can be reduced.

The second embodiment of the modulating apparatus will be described. In the second embodiment, the portions will be described that differ from the first embodiment.

Figure 15B:
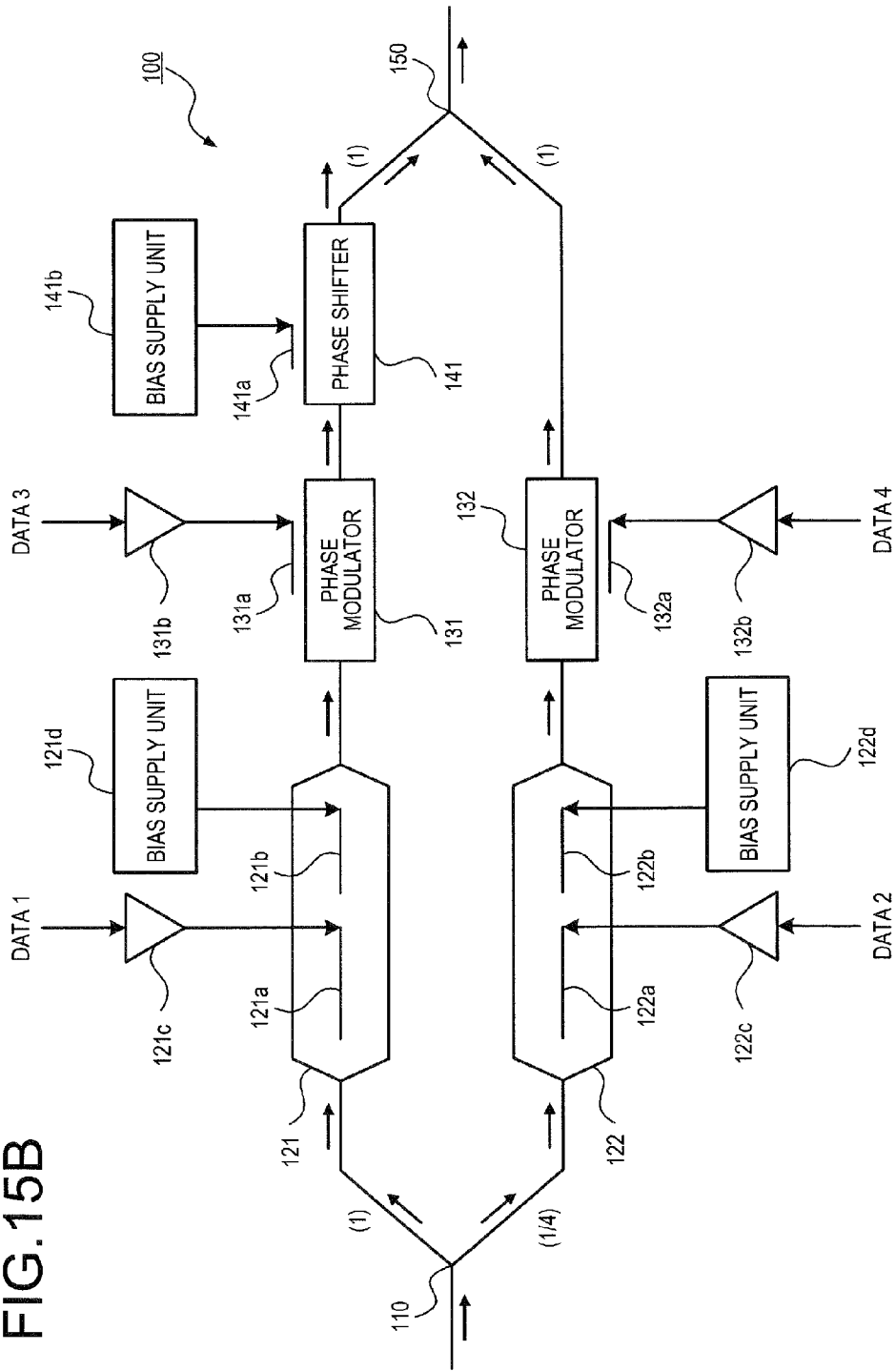
FIG. 15B is a diagram of an example of flows of light beams and electric signals in the modulating apparatus depicted in FIG. 15A.

FIG. 15A is a diagram of an example of a specific configuration of a modulating apparatus according to the second embodiment. FIG. 15B is a diagram of an example of flows of light beams and electric signals in the modulating apparatus depicted in FIG. 15A. In FIGS. 15A and 15B, configurations same as the configurations depicted in FIGS. 1A and 1B are given the same reference numerals and will not again be described.

As depicted in FIGS. 15A and 15B, the modulating apparatus 100 according to the second embodiment does not need to include the attenuator 142. The branch 110 branches the light beam input into the modulating apparatus 100 into light beams at different intensities. For example, the branch 110 branches the input light beam at the intensity ratios of 1:¼. The phase modulator 132 outputs the light beam acquired by the phase modulation to the coupler 150.

The coupler 150 couples the optical signal output from the phase shifter 141 and the optical signal output from the phase modulator 132. For example, the coupler 150 couples the optical signal output from the phase shifter 141 and the optical signal output from the phase modulator 132 at the intensity ratios of 1:1. Thus, the intensity ratios can be set to be 1:¼ of the optical signal modulated by the Mach-Zehnder modulator 121 and the phase modulator 131 and the optical signal modulated by the Mach-Zehnder modulator 122 and the phase modulator 132. With the above configuration, the optical signal output from the coupler 150 is converted into a 16-QAM optical signal.

Figure 16A:
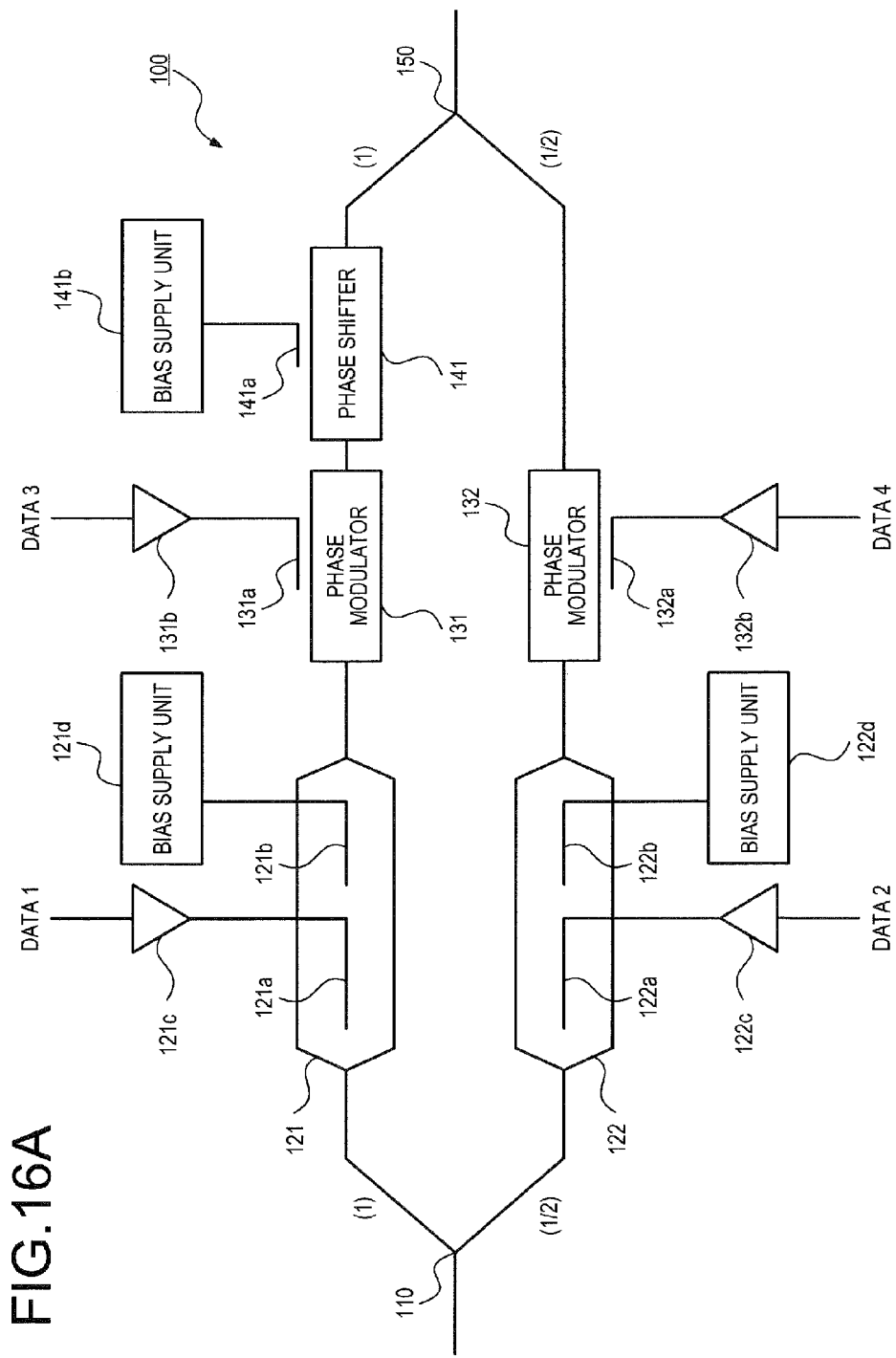
FIG. 16A is a diagram of a configuration of a variation of the modulating apparatus according to the second embodiment.
Figure 16B:
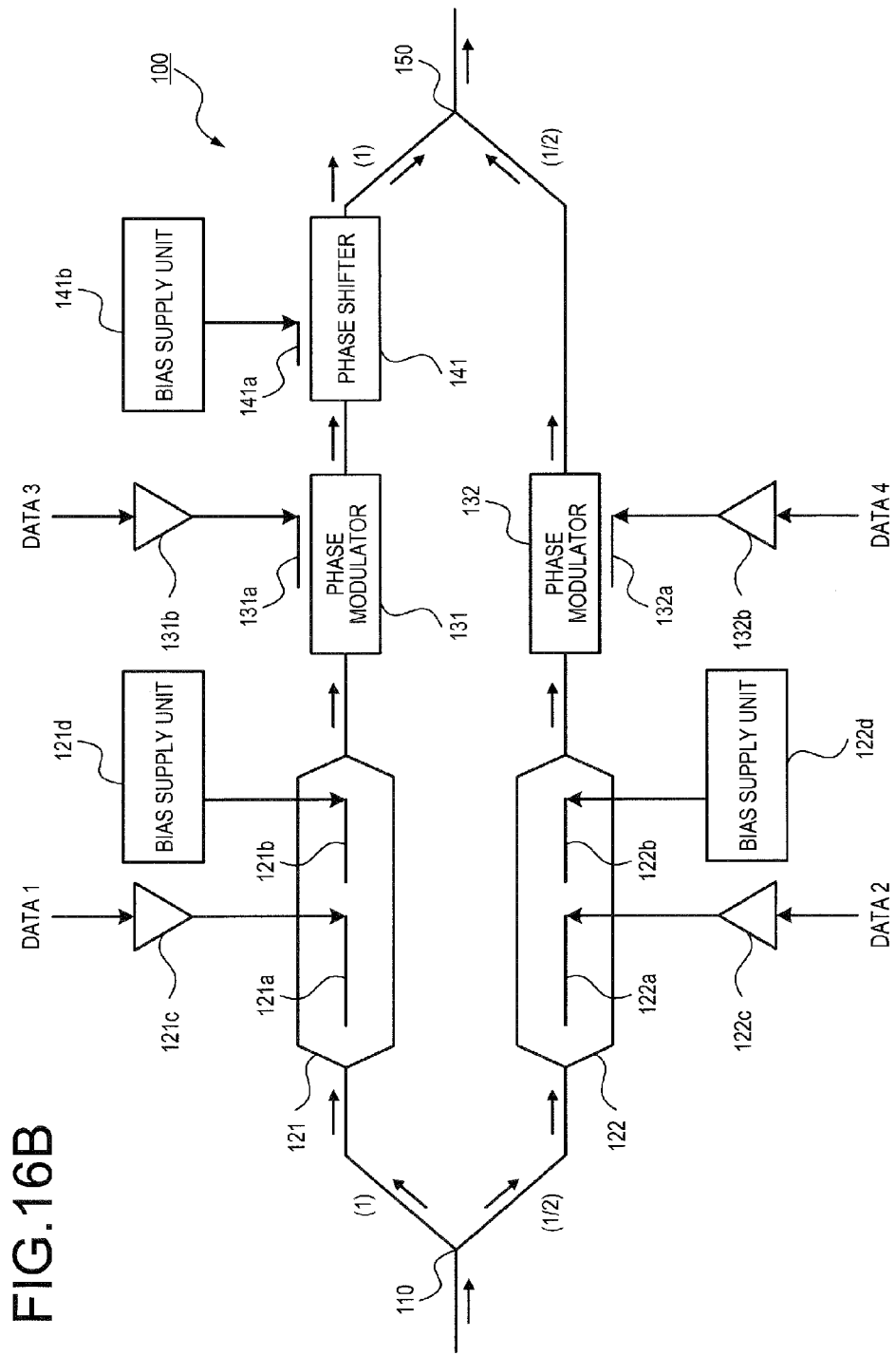
FIG. 16B is a diagram of an example of flows of light beams and electric signals in the modulating apparatus depicted in FIG. 16A.

A variation of the modulating apparatus according to the second embodiment will be described. In the variation of the modulating apparatus according to the second embodiment, the case will be described where the intensity ratio of each of the input and the output light beams is made variable. FIG. 16A is a diagram of a configuration of a variation of the modulating apparatus according to the second embodiment. FIG. 16B is a diagram of an example of flows of light beams and electric signals in the modulating apparatus depicted in FIG. 16A. In FIGS. 16A and 16B, configurations same as the configurations depicted in FIGS. 15A and 15B are given the same reference numerals and will not again be described. As depicted in FIGS. 16A and 16B, the branch 110 branches the light beam input into the modulating apparatus 100 into light beams at different intensity ratios.

For example, the branch 110 branches the input light beam at the intensity ratios of 1:½. The coupler 150 couples the light beam from the phase shifter 141 and the light beam from the phase modulator 132 at different intensity ratios. For example, the coupler 150 couples the optical signal output from the phase shifter 141 and the optical signal output from the phase modulator 132 at the intensity ratios of 1:½.

Thus, the intensity ratios can be set to be 1:¼ of the optical signal modulated by the Mach-Zehnder modulator 121 and the phase modulator 131 and the optical signal modulated by the Mach-Zehnder modulator 122 and the phase modulator 132. With the above configuration, the optical signal output from the coupler 150 is converted into a 16-QAM optical signal.

Thus, according to the modulating apparatus 100 according to the second embodiment, similarly to the first embodiment, the control and the configuration of the modulating apparatus 100 can be simplified. Especially, the modulating apparatus 100 according to the second embodiment can be configured not to include the attenuator 142 and, therefore, no bias control needs to be executed for the attenuator 142. Thus, the control and the configuration of the modulating apparatus 100 can further be simplified.

The third embodiment of the modulating apparatus will be described. In the third embodiment, a modulating apparatus will be described that modulates a $4^N$-QAM optical signal ("N" is an integer that is two or greater). In the third embodiment, the portions will be described that differ from the first and the second embodiments.

Figure 17A:
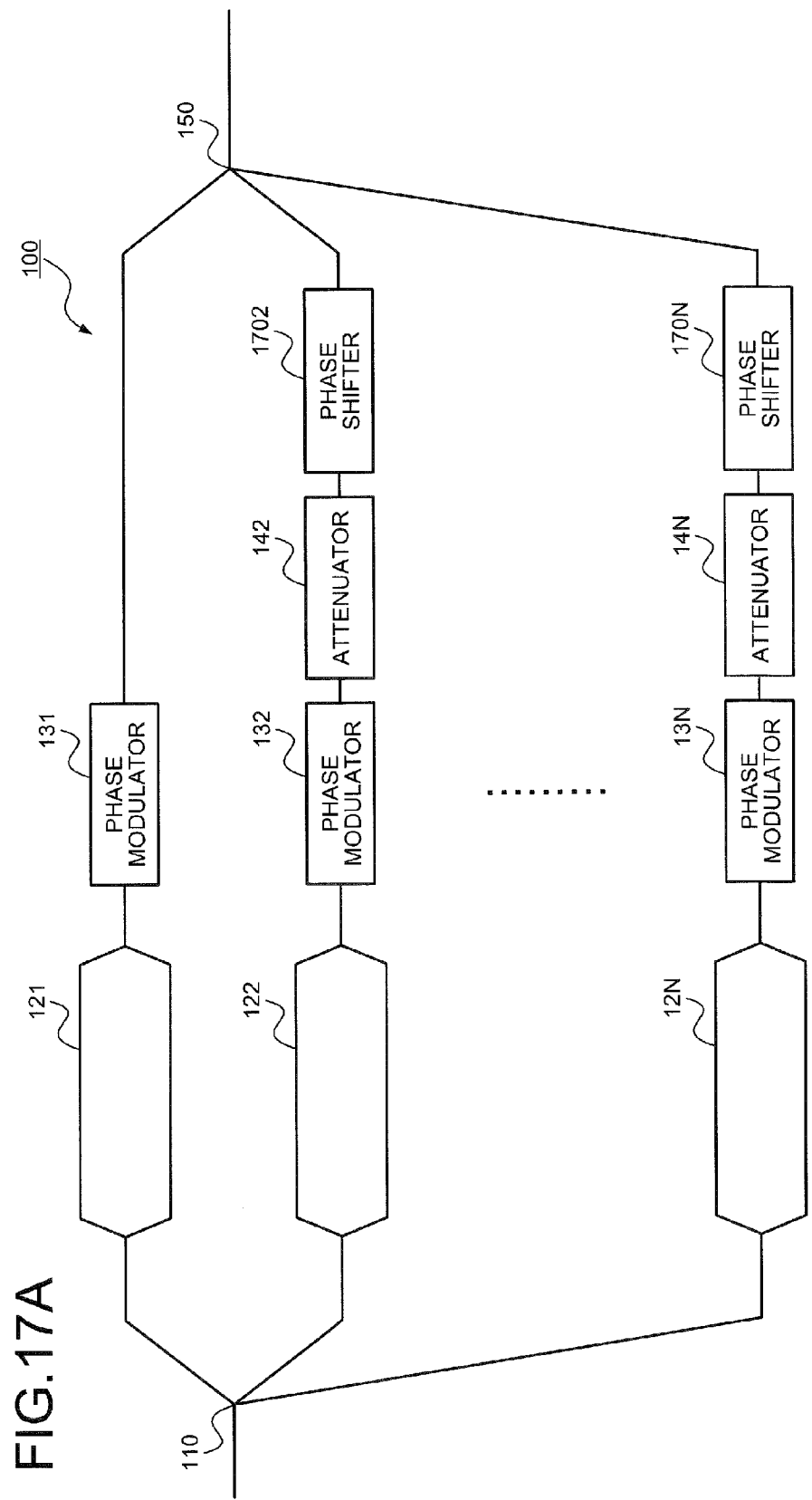
FIG. 17A is a diagram of an example of a specific configuration of a modulating apparatus according to a third embodiment.

FIG. 17A is a diagram of an example of a specific configuration of a modulating apparatus according to the third embodiment. FIG. 17B is a diagram of an example of flows of light beams and electric signals in the modulating apparatus depicted in FIG. 17A. In FIGS. 17A and 17B, configurations same as the configurations depicted in FIGS. 1A and 1B are given the same reference numerals and will not again be described.

As depicted in FIGS. 17A and 17B, the modulating apparatus 100 includes the branch 110, the Mach-Zehnder modulators 121 to 12N, the phase modulators 131 to 13N, the attenuators 142 to 14N, phase shifters 1702 to 170N, and the coupler 150.

The branch 110 N-branches the light beam input into the modulating apparatus 100 and outputs the N-branched light beams to the Mach-Zehnder modulators 121 to 12N. The Mach-Zehnder modulators 121 to 12N execute two-value phase modulation for the light beams output from the branch 110 and respectively output the light beams acquired by the phase modulation, to the phase modulators 131 to 13N.

The phase modulators 131 to 13N respectively execute four-value phase modulation for the optical signals output from the Mach-Zehnder modulators 121 to 12N, corresponding to the driving signal. The phase modulator 131 outputs the light beam acquired by the phase modulation to the coupler 150. The phase modulators 132 to 13N respectively output the light beams acquired by the phase modulation to the attenuators 142 to 14N. The attenuators 142 to 14N attenuate by, for example, $6^{N-1}$ [dB] the intensities of the optical signals output from the phase modulators 132 to 13N.

The attenuators 142 to 14N respectively output the attenuated optical signals to the phase shifters 1702 to 170N. The phase shifters 1702 to 170N respectively correct the phase shifts of the optical signals output from the attenuators 142 to 14N and output the corrected optical signals to the coupler 150. The coupler 150 couples the optical signal output from the phase modulator 131 and those output from the phase shifters 1702 to 170N.

Thus, the intensity ratios can be set to be $1:\frac{1}{4}:\ldots:\frac{1}{4}^{N-1}$ of the optical signal modulated by the Mach-Zehnder modulator 121 and the phase modulator 131 and the optical signals modulated by the Mach-Zehnder modulators 122 to 12N and the phase modulators 132 to 13N. Therefore, the optical signal output from the coupler 150 can be converted into a $4^N$-QAM optical signal.

Thus, according to the modulating apparatus 100 according to the third embodiment, the control and the configuration of the modulating apparatus 100 can be simplified that modulates the $4^N$-QAM optical signal.

Figure 18A:
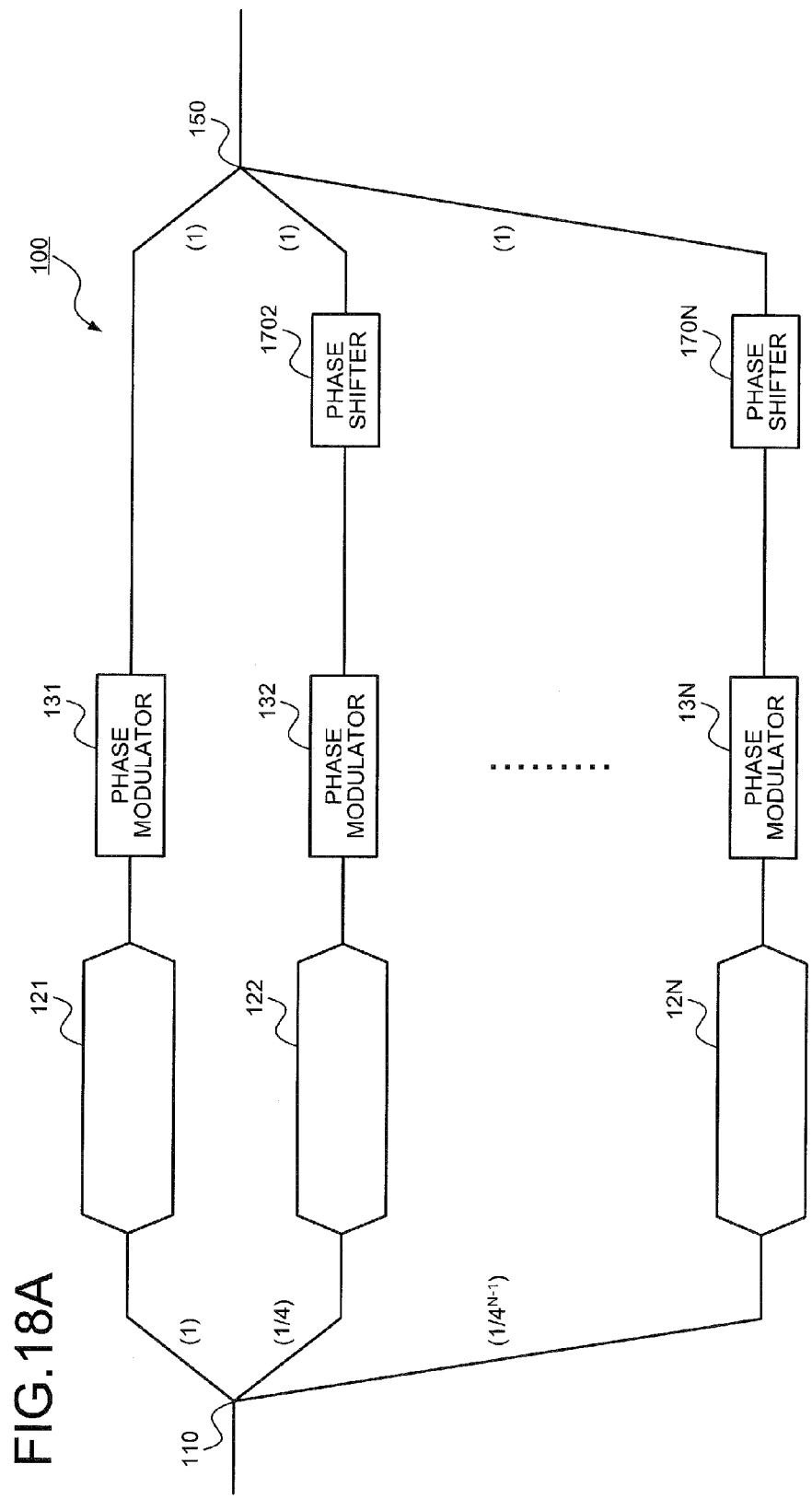
FIG. 18A is a diagram of a configuration of variation 1 of the modulating apparatus according to a third embodiment.
Figure 18B:
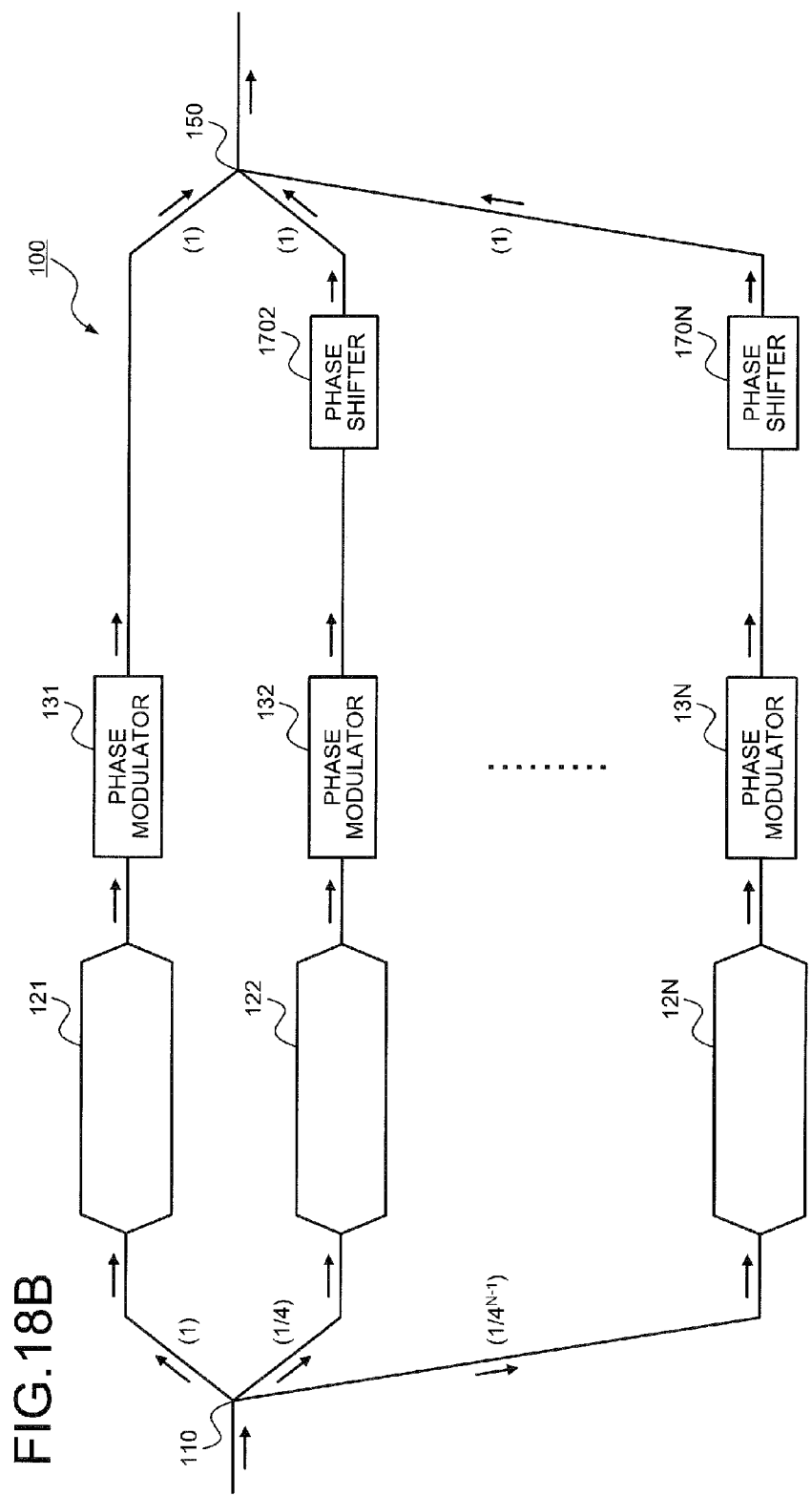
FIG. 18B is a diagram of an example of flows of light beams and electric signals in the modulating apparatus depicted in FIG. 18A.

A variation 1 of the modulating apparatus according to the third embodiment will be described. For the variation 1 of the modulating apparatus according to the third embodiment, the case will be described where the attenuators 142 to 14N are not included. FIG. 18A is a diagram of a configuration of the variation 1 of the modulating apparatus according to the third embodiment. FIG. 18B is a diagram of an example of flows of light beams and electric signals in the modulating apparatus depicted in FIG. 18A. In FIGS. 18A and 18B, configurations same as the configurations depicted in FIGS. 17A and 17B are given the same reference numerals and will not again be described.

As depicted in FIG. 18A, the branch 110 N-branches the light beam input into the modulating apparatus 100, into light beams at different intensity ratios. For example, the branch 110 branches the input light beam at the intensity ratios of $1:\frac{1}{4}:\ldots:\frac{1}{4}^{N-1}$.

The phase modulators 132 to 13N respectively output the light beams acquired by the phase modulation to the phase shifters 1702 to 170N. The phase shifters 1702 to 170N respectively correct phase shifts of the optical signals output from the phase modulators 132 to 13N and output the corrected optical signals to the coupler 150.

The coupler 150 couples the optical signal output from the phase modulator 131 and those output from the phase shifters 1702 to 170N at equal intensity ratios Thus, the intensity ratios can be set to be $1:\frac{1}{4}:\ldots:\frac{1}{4}^{N-1}$ of the optical signal modulated by the Mach-Zehnder modulator 121 and the phase modulator 131 and those modulated by the Mach-Zehnder modulators 122 to 12N and the phase modulators 132 to 13N. With this configuration, similarly to the third embodiment, the optical signal output from the coupler 150 can be converted into a $4^N$-QAM optical signal.

Thus, according to the modulating apparatus 100 according to the variation 1 of the third embodiment, similarly to the modulating apparatus 100 according to the third embodiment, the control and the configuration of the modulating apparatus 100 can be simplified. Especially, the modulating apparatus 100 according to the variation 1 of the third embodiment can be configured not to include the attenuators 142 to 14N and, therefore, the bias control does not need to be executed for each of the attenuators 142 to 14N. Thus, the control and the configuration of the modulating apparatus 100 can be further simplified.

Figure 19B:
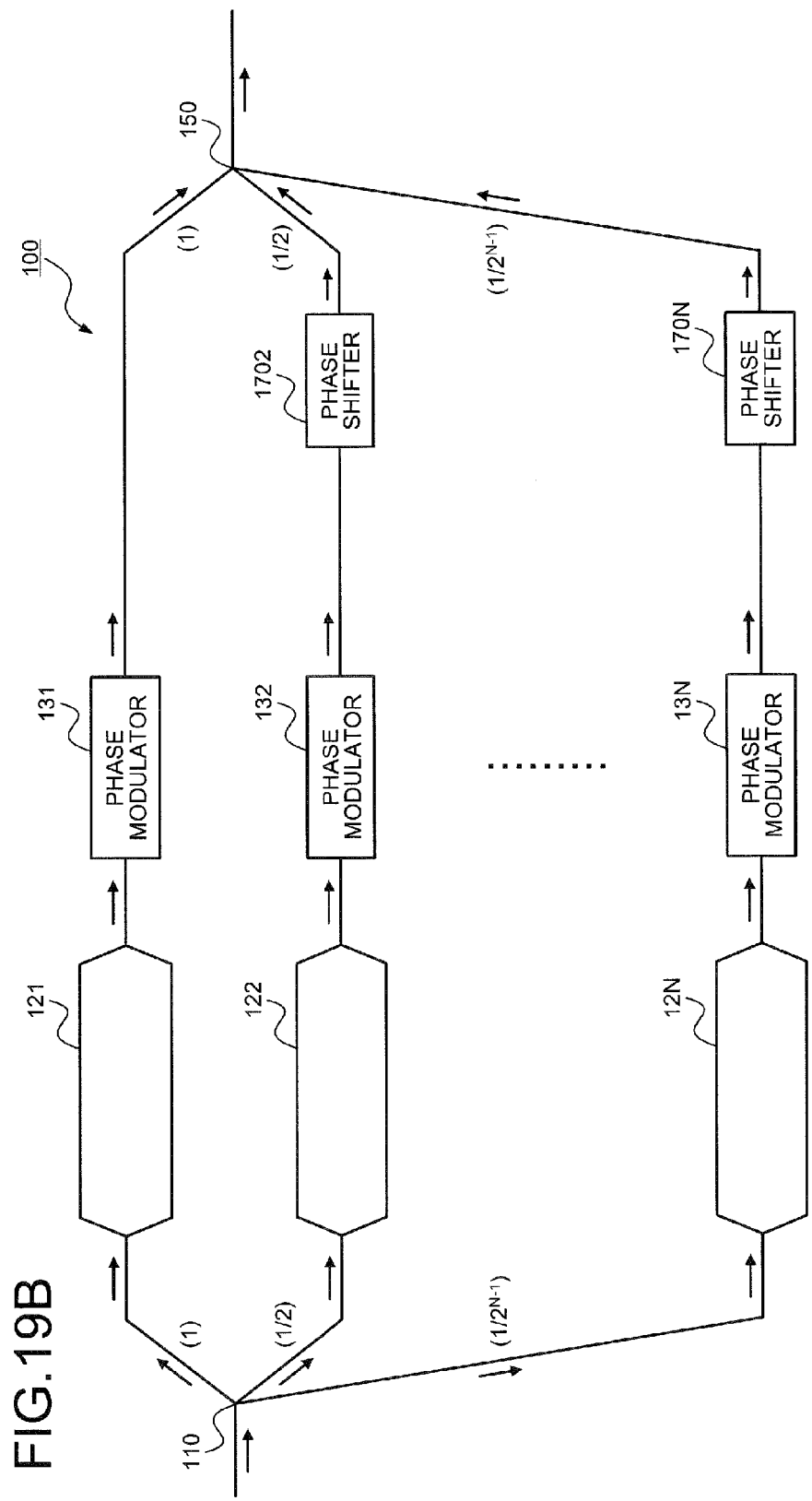
FIG. 19B is a diagram of an example of flows of light beams and electric signals in the modulating apparatus depicted in FIG. 19A.

A variation 2 of the modulating apparatus according to the third embodiment will be described. For the variation 2 of the modulating apparatus according to the third embodiment, the case will be described where the intensity ratio of each of the input and the output light beams is made variable. FIG. 19A is a diagram of a configuration of the variation 2 of the modulating apparatus according to the third embodiment. FIG. 19B is a diagram of an example of flows of light beams and electric signals in the modulating apparatus depicted in FIG. 19A. In FIGS. 19A and 19B, configurations same as the configurations depicted in FIGS. 17A to 18B are given the same reference numerals and will not again be described.

As depicted in FIGS. 19A and 19B, the branch 110 branches the light beam input into the modulating apparatus 100, into light beams at different intensity ratios. For example, the branch 110 branches the input light beam at the intensity ratios of $1:\frac{1}{2}:\ldots:\frac{1}{2}^{N-1}$.

The coupler 150 couples the optical signal output from the phase modulator 131 and those output from the phase shifters 1702 to 170N at different intensity ratios. For example, the coupler 150 couples the optical signals output from the phase shifters 1702 to 170N and the optical signal output from the phase modulator 131 at the intensity ratios of $1:\frac{1}{2}:\ldots:\frac{1}{2}^{N-1}$. Thus, the intensity ratios can be set to be $1:\frac{1}{4}:\ldots:\frac{1}{4}^{N-1}$ of the optical signal modulated by the Mach-Zehnder modulator 121 and the phase modulator 131 and those modulated by the Mach-Zehnder modulators 122 to 12N and the phase modulators 132 to 13N. With this configuration, similarly to the third embodiment, the optical signal output from the coupler 150 can be converted into a $4^N$-QAM optical signal.

Thus, according to the modulating apparatus 100 according to the variation 2 of the third embodiment, similarly to the modulating apparatus 100 according to the variation 1 of the third embodiment, the control and the configuration of the modulating apparatus 100 can be simplified.

The fourth embodiment of the modulating apparatus will be described. In the fourth embodiment, the case will be described where the Mach-Zehnder modulators 121 and 122 and the phase modulators are not provided in series but the phase modulators are provided in series. In the fourth embodiment, portions will be described that differ from the first to the third embodiments.

Figure 20A:
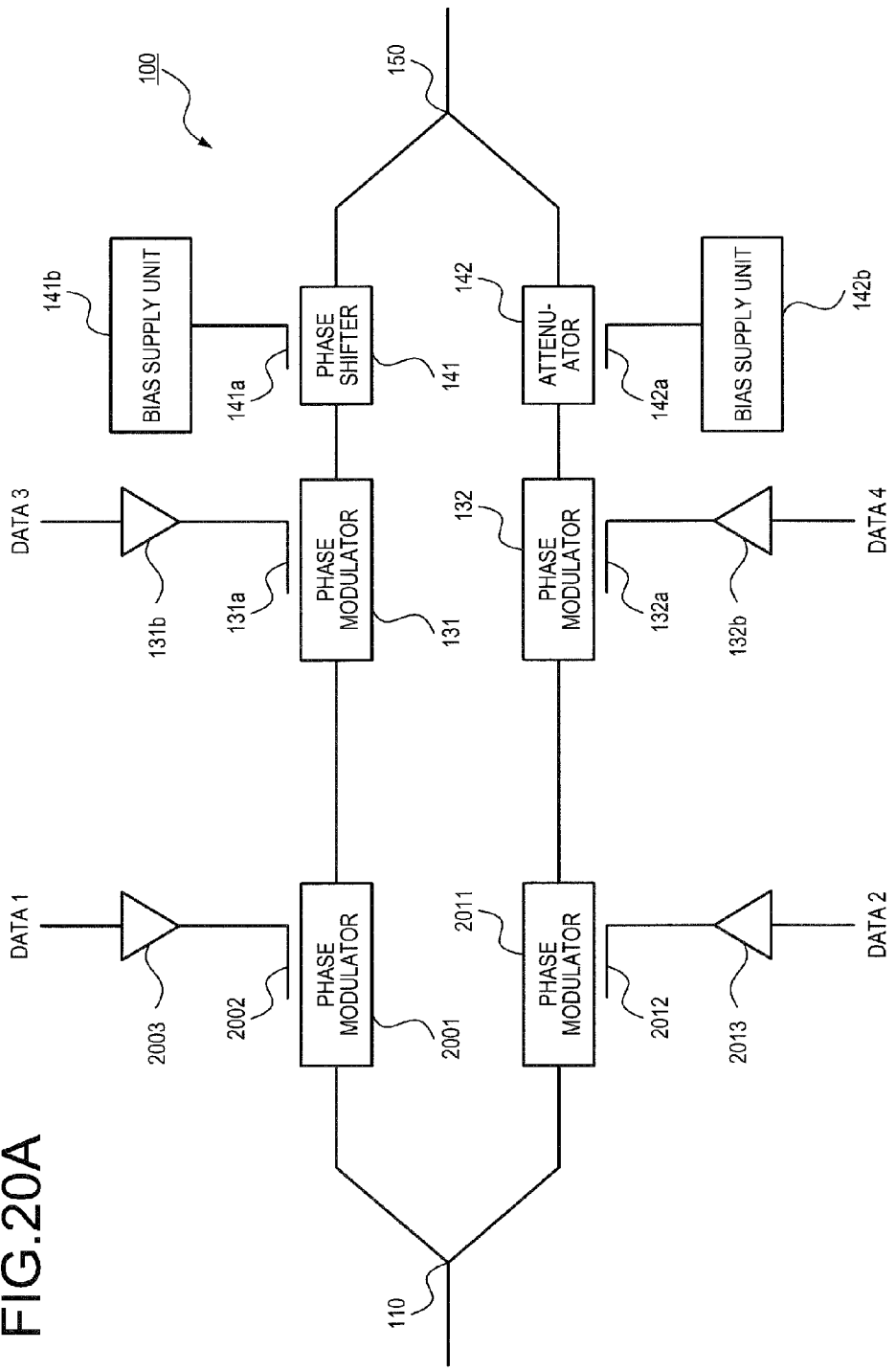
FIG. 20A is a diagram of an example of a specific configuration of a modulating apparatus according to a fourth embodiment.

FIG. 20A is a diagram of an example of a specific configuration of a modulating apparatus according to the fourth embodiment. FIG. 20B is a diagram of an example of flows of light beams and electric signals in the modulating apparatus depicted in FIG. 20A. In FIGS. 20A and 20B, configurations same as the configurations depicted in FIGS. 1A and 1B are given the same reference numerals and will not again be described.

As depicted in FIGS. 20A and 20B, a modulating apparatus 100 according to the fourth embodiment includes phase modulators 2001 and 2011 in stead of the Mach-Zehnder modulators 121 and 122 described in the first embodiment (see, e.g., FIGS. 1A and 1B). For example, the modulating apparatus 100 includes the phase modulators 2001 and 2011, and driving units 2003 and 2013 in stead of the Mach-Zehnder modulators 121 and 122, the driving units 121c and 122c, and the bias supply units 121d and 122d that are described in the first embodiment.

The branch 110 branches the light beam input into the modulating apparatus 100 and outputs the branched light beams to the phase modulators 2001 and 2011. The phase modulator 2001 includes an RF electrode 2002. The driving unit 2003 generates a driving signal that corresponds to the data 1 input thereinto and applies the driving signal to the RF electrode 2002.

The phase modulator 2001 executes phase modulation to vary by zero or π the phase of the optical signal output from the branch 110. Thus, two-value (zero and π) phase modulation can be executed. The phase modulator 2001 outputs the light beam acquired by the phase modulation to the phase modulator 131.

The phase modulator 2011 includes an RF electrode 2012. The driving unit 2013 generates a driving signal that corresponds to the data 2 input thereinto and applies the driving signal to the RF electrode 2012. The phase modulator 2011 executes phase modulation to vary by zero or π the phase of the optical signal output from the branch 110 corresponding to the driving signal applied to the RF electrode 2012. Thus, two-value (zero and π) phase modulation can be executed. The phase modulator 2011 outputs the light beam acquired by the phase modulation to the phase modulator 132.

The phase modulator 131 executes the phase modulation to vary by zero or π the phase of the optical signal output from the phase modulator 2001 corresponding to the driving signal applied to the RF electrode 131a. Thus, four-value (zero, π/2, π, and 3π/2) phase modulation can be executed.

The phase modulator 132 executes the phase modulation to vary by zero or π the phase of the optical signal output from the phase modulator 2011 corresponding to the driving signal applied to the RF electrode 132a. Thus, four-value (zero, π/2, π, and 3π/2) phase modulation can be executed.

With this configuration, similarly to the first embodiment, such optical signals can be coupled at the intensity ratios of 1:¼ as that modulated by the phase modulators 2001 and 131 and that modulated by the phase modulators 2011 and 132. Thus, the optical signal output from the coupler 150 can be converted into the 16-QAM optical signal.

The units to be controlled can be reduced to six units as a total that are: the driving units 131b, 132b, 2003, and 2013; and the bias supply units 141b and 142b. Therefore, the configuration and the control can further be simplified compared to the first embodiment.

The modulating apparatus 100 according to the fourth embodiment may be configured not to include the attenuator 142. For example, as described for the second embodiment (see, e.g., FIGS. 15A to 16B), the modulating apparatus 100 may be configured for the branch 110 to branch the light beam into light beams at different intensities or may also be configured for the coupler 150 to couple the light beams at different intensities.

The modulating apparatus 100 according to the fourth embodiment is configured to modulate the 16-QAM optical signal while may be configured to modulate a $4^N$-QAM optical signal. For example, the modulating apparatus 100 according to the fourth embodiment may be configured to have three or more stages with N that is N≥2 as described for the third embodiment (see, e.g., FIGS. 17A to 19B).

Thus, in the fourth embodiment: the phase modulators 2001 and 131 are connect to each other in series and, thereby, the four- or more-value phase modulation can be executed; and the phase modulators 2011 and 132 are connect to each other in series and, thereby, the four- or more-value phase modulation can be executed. The optical signals each applied with the four- or more-value phase modulation are coupled at different intensities and, thereby, the 16- or more-value QAM is enabled.

The phase modulators 131, 132, 2001, and 2011 do not branch any light beam and do not cause any light beams to interfere with each other and, therefore, their transmission factors are not varied even when any phase shift occurs. Thus, the control of the phase modulators 131, 132, 2001, and 2011 can be simplified. For example, no bias control needs to be executed for the phase modulators 131, 132, 2001, and 2011. Therefore, the control of the modulating apparatus 100 can be simplified.

According to an aspect of the present invention, an effect is achieved that the control can be simplified.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A modulating apparatus comprising:
    a branch that branches a light beam input thereinto;
    a first modulating unit that modulates the phase of a first light beam of light beams branched by the branch;
    a second modulating unit that modulates a second light beam different from the first light beam of the light beams branched by the branch;
    a third modulating unit that is connected in series to the first modulating unit and transmits the first light beam without branching the first light beam, the third modulating unit modulating the phase of a light beam transmitted thereby by controlling a refractive index of the light beam transmitted thereby;
    a fourth modulating unit that is connected in series to the second modulating unit and transmits the second light beam without branching the second light beam, the fourth modulating unit modulating the phase of a light beam transmitted thereby by controlling a refractive index of the light beam transmitted thereby; and
    a coupler that couples the first light beam of which phase is modulated by the first and the third modulating units and the second light beam of which phase is modulated by the second and the fourth modulating units, at different intensities.

2. The modulating apparatus of claim 1, wherein
    each of the first and the second modulating units executes phase modulation of zero or π, and wherein
    each of the third and the fourth modulating units executes phase modulation of zero or π/2.

3. The modulating apparatus of claim 1, wherein
    each of the third and the fourth modulating units has a transmission property maintained constant for the modulated light beam against a phase of the modulated light beam.

4. The modulating apparatus of claim 1, wherein
    each of the third and the fourth modulating units comprises one optical waveguide achieving an electro-optical effect, and an electrode to apply an electric field corresponding to a voltage applied thereto to the optical waveguide.

5. The modulating apparatus of claim 1, wherein
each of the first and the second modulating units executes the phase modulation by branching a light beam input thereinto, controlling a phase difference between branched light beams, and coupling the branched light beams.

6. The modulating apparatus of claim 1, further comprising
a detecting unit that detects a shift of a phase-modulation amount caused by the third and the fourth modulating units based on the light beam coupled by the coupler, wherein
each of the third and the fourth modulating units executes the phase modulation based on a result of the detection by the detecting unit.

7. The modulating apparatus of claim 6, wherein
the detecting unit detects the shift of the phase-modulation amount caused by the third and the fourth modulating units based on a normal-phase light beam of the light beam coupled by the coupler.

8. The modulating apparatus of claim 6, wherein
the detecting unit detects the shift of the phase-modulation amount caused by the third and the fourth modulating units based on an opposite-phase light beam of the light beam coupled by the coupler.

9. The modulating apparatus of claim 1, wherein
each of the first and the second modulating units has a transmission property maintained constant for the modulated light beam against a phase of the modulated light beam.

10. The modulating apparatus of claim 1, further comprising
an attenuator that attenuates at least either one of the first and the second light beams such that intensities of the first and the second light beams coupled by the coupler are different from each other.

11. The modulating apparatus of claim 1, wherein
the branch branches a light beam input thereinto, into the first light beam and the second light beam whose intensity is ¼ of an intensity of the first light beam.

12. The modulating apparatus of claim 1, wherein
the branch branches a light beam input thereinto, into the first light beam and the second light beam whose intensity is ½ of an intensity of the first light beam, and wherein
the coupler couples the first light beam and the second light beam at intensity ratios respectively of 1:½.

13. The modulating apparatus of claim 1, further comprising:
a fifth modulating unit that modulates the phase of a third light beam different from the first and the second light beams of light beams branched by the branch; and
a sixth modulating unit that is connected in series to the fifth modulating unit and transmits the third light beam without branching the third light beam, the sixth modulating unit modulating the phase of a light beam transmitted thereby by controlling a refractive index of the light beam transmitted thereby, wherein
the coupler couples the first light beam of which phase is modulated by the first and the third modulating units, the second light beam of which phase is modulated by the second and the fourth modulating units, and third light beam of which phase is modulated by the fifth and the sixth modulating units, at different intensities.

* * * * *